US006437743B1

(12) United States Patent
Mintz et al.

(10) Patent No.: US 6,437,743 B1
(45) Date of Patent: Aug. 20, 2002

(54) METHOD AND SYSTEM FOR MAPPING AND TRACKING INFORMATION FROM A PLURALITY OF REMOTE STATIONS

(75) Inventors: Yosef Mintz, 14 Savyon Street, Petach Tikva 49542 (IL); Paul Fenster, Petach Tikva (IL)

(73) Assignee: Yosef Mintz, Petach-Tikva (IL)

( * ) Notice: Subject to any disclaimer, the term of this patent is extended or adjusted under 35 U.S.C. 154(b) by 0 days.

(21) Appl. No.: 08/836,550

(22) PCT Filed: Oct. 18, 1995

(86) PCT No.: PCT/US95/13232

§ 371 (c)(1),
(2), (4) Date: Aug. 22, 1997

(87) PCT Pub. No.: WO96/14586

PCT Pub. Date: May 17, 1996

Related U.S. Application Data

(63) Continuation-in-part of application No. PCT/EP95/01330, filed on Apr. 10, 1995, which is a continuation-in-part of application No. 08/232,776, filed on Apr. 25, 1994, now Pat. No. 5,532,702, which is a continuation-in-part of application No. PCT/EP93/03418, filed on Dec. 6, 1993.

(30) Foreign Application Priority Data

| Dec. 4, 1992 | (IL) | ................................. | 103976 |
| Apr. 11, 1994 | (IL) | ................................. | 109291 |
| Nov. 2, 1994 | (IL) | ................................. | 111502 |
| Jun. 19, 1995 | (IL) | ................................. | 114219 |
| Oct. 11, 1995 | (IL) | ................................. | 115579 |

(51) Int. Cl.$^7$ ................................................ G01S 3/02

(52) U.S. Cl. ........................ 342/463; 342/458; 342/457

(58) Field of Search .............................. 342/463, 458, 342/457, 387

(56) References Cited

U.S. PATENT DOCUMENTS

| 2,605,361 A | 7/1952 | Cutler |
| 3,697,941 A | 10/1972 | Christ |
| 4,471,341 A | 9/1984 | Sauer |

(List continued on next page.)

FOREIGN PATENT DOCUMENTS

| DE | 33 30 904 A1 | 8/1983 |
| EP | 0 389 488 B1 | 10/1990 |
| JP | 58-218 240 | 4/1984 |

(List continued on next page.)

OTHER PUBLICATIONS

"Computer Networks", Second Edition, Andrew S. Tanenbaum, pp. 79–82 and pp. 120–126.
Considine,D. M.; "Encyclopedia of Instrumentation and Control;" 1971;McGraw–Hill; p. 181.

(List continued on next page.)

*Primary Examiner*—Theodore M. Blum
(74) *Attorney, Agent, or Firm*—Fenster & Company Patent Attorneys Ltd.

(57) ABSTRACT

A method of mapping (FIG. 10) a characteristic value of a plurality of remote stations (18–24) each having a varying attribute affecting the characteristic value computed according to a predetermined procedure comprising: (a) assigning a plurality of transmission slots to each of the remote stations; (b) determining, by the respective stations, of their characteristic values; (c) initially broadcasting, by the respective stations, of their determined characteristic values in said plurality of transmission slots, said broadcast characteristic value having a first characteristic value resolution; and (d) subsequently broadcasting, by the stations, of their respective characteristic values in said plurality of transmission slots, said subsequent broadcasting having a finer characteristic value resolution relative to said previously broadcasted characteristic value having a first characteristic value resolution.

129 Claims, 17 Drawing Sheets

U.S. PATENT DOCUMENTS

| | | | |
|---|---|---|---|
| 4,661,914 A | | 4/1987 | Mulokey et al. |
| 5,168,451 A | | 12/1992 | Bolger |
| 5,243,530 A | | 9/1993 | Stanifer et al. |
| 5,532,702 A | * | 7/1996 | Mintz .................... 342/463 |
| 5,768,276 A | * | 6/1998 | Diachina et al. ............ 370/432 |
| 5,943,361 A | * | 8/1999 | Gilhousen et al. .......... 375/200 |

FOREIGN PATENT DOCUMENTS

| | | |
|---|---|---|
| JP | 60-059839 | 8/1985 |
| JP | 60-064549 | 8/1985 |
| JP | 61-095632 | 9/1986 |
| WO | WO 89 03106 | 4/1989 |
| WO | WO 93/04453 A1 | 3/1993 |
| WO | WO 94/14288 | 6/1994 |
| WO | PCT/EP95/01330 | 4/1995 |

OTHER PUBLICATIONS

Strock, O.J.; "Telemetry Computer Systems;" 1983; Instrument Society of America; p. 12.

Pauli, P. et al.; "Telemetrix;" 1980; Expert Verlag; pp. 44 and 63 (and translation to English language attached to the reference).

* cited by examiner

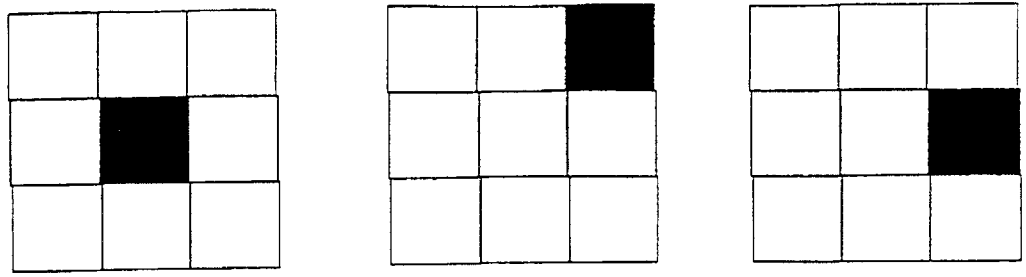
*Fig. 16-A*
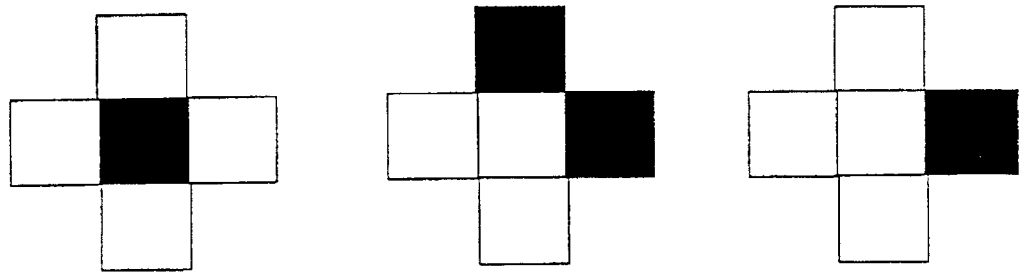
*Fig. 16-B*
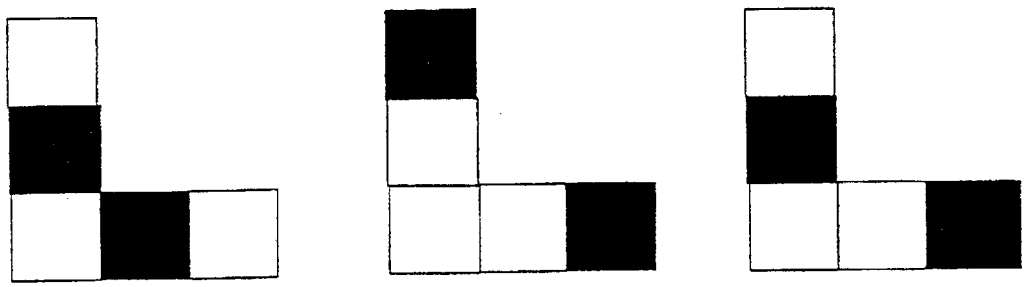
*Fig. 16-C*

METHOD AND SYSTEM FOR MAPPING AND TRACKING INFORMATION FROM A PLURALITY OF REMOTE STATIONS

RELATED APPLICATIONS

This application is a continuation in part of PCT application PCT/EP95/01330, filed Apr. 10, 1995, which designates the united states which is a continuation in part of U.S. patent application Ser. No. 08/232,776, filed Apr. 25, 1994, now U.S. Pat. No. 5,532,702, which is a continuation in part of PCT application PCT/EP93/03418, filed Dec. 6, 1993 which designates the United States.

FIELD OF THE INVENTION

This invention relates generally to a method and system for obtaining information from a plurality of remote stations.

BACKGROUND OF THE INVENTION

It is a common requirement to target and possibly identify quickly one or several out of a plurality of participants according to specific selection criteria.

It is frequently required to select one or more participants according to a "priority" or "characteristic value" based on specified selection criteria for the purpose of allocating a particular task to the participant or participants having the highest priority.

In dispatching systems, for example, for dispatching a taxi or messenger to a customer at a specified location, it is desirable that a suitable (and preferably the most suitable) taxi or messenger be sent to a particular customer. Generally the nearest, unoccupied taxi which has sufficient accommodation should be dispatched to the customer. Furthermore, it is desirable that the allocation be accomplished in the minimum possible time.

Typical existing dispatching systems include a central dispatch station having a transmitter and receiver or a transceiver in each of the participating vehicles for communicating with the central dispatch station. Typically, a voice request is transmitted by a dispatcher to each of the participating vehicles, and the dispatcher decides which of the vehicles is most suited to the task in hand based on the replies from the vehicles.

Such a system would be capable of simple implementation if the selection criteria related to static variables only. Thus, if the only selection criterion were a taxi's current distance from the customer and each taxi were stationary, it would merely be necessary to extract the taxi's locations once, after which it would be simple to determine which taxi were nearest to the customer's location. However, in practice, the selection criteria relate to dynamic variables which, by definition, are changing constantly and therefore it is necessary continuously to update each taxi's distance from the customer's location and/or other information required to choose a taxi for the given task) or at least to do so each time a taxi is to be dispatched.

In some typical prior art systems, this is done by providing the dispatcher with a periodically updated map that shows the respective location of each of the taxis. This updating is accomplished by the periodic transmission of a location message by each of the taxis via a communication channel. In order to ensure that the transmitted data can be received quickly and without corruption, the total spectrum width of the communication system must be very large.

In a system described in EP 0389488 job requests are dispatched by a controller to mobile vehicles which messages include information about the location of a job. Each vehicle has a receiver, transmitter and circuitry to compare the requirements of the job with the status of the vehicle. If the results of the comparison is that the vehicle is suitable for the job, then it transmits a message back to the controller volunteering itself for the job.

It should also be noted that, even in the specific case of a taxi or messenger service, distance from the customer location is by no means the only criterion according to which a task may be allocated. Thus, it may well be that the nearest messenger or taxi is already occupied and is therefore not available for performing the task. Alternatively, the nearest available taxi may not have sufficient room for carrying all the passengers to whom a taxi must be sent; or perhaps a particularly bulky load must be carried and t he nearest, available taxi or messenger is inadequate for the task.

Yet a further consideration is that it is often preferred to dispatch to a customer an idle taxi waiting at the taxi rank rather than go through the process of transmitting a voice message and awaiting responses from taxis in the field prior to allocating the task to one of them. In the event that several idle taxis are waiting at the taxi rank, or where several taxis are reasonably close to the customer, it is often preferable that the taxi which has been idle for the longest period of time be selected.

Furthermore, it may not always be desirable to dispatch the nearest available taxi to a particular customer location if other customers, albeit further away, have made prior requests which have not yet been serviced.

Even apart from some of the basic limitations of prior art systems described above, it is often desirable to target and possibly to identify participants according to several selection criteria. This is somewhat analogous to performing a database search by means of key words which can be combined according to the rules of Boolean or other logic systems. However, database records are generally static and are stored at a single location. In contrast to this, the attributes of the participants that are the subject of the present invention are dynamic and constantly changing, and cannot be characterized by static data which can be stored at a single site. Thus, if the dynamic data characterizing such participants are to be searched at a single site, then the data must first be downloaded to the site where the search is to be performed. During the time that such data are downloaded, they may well change, thereby compromising the accuracy of the search which is subsequently performed.

Another application which, requires the receiving and processing of information from a large number of sources is IVHS. In this application, for example, information on position and speed from a large number of vehicles is processed in order to obtain information on road delays. Again, the sending of large amounts of information requires substantial bandwidths even though the vehicles themselves need not be identified.

Another previously unsolved problem is the tracking or mapping of the position of large numbers of vehicles. Prior solutions to this problem required the broadcasting by each vehicle of an information bearing signal including at least its position. When large numbers of vehicles are to be tracked, the amount of information to be transmitted (and the communication overhead associated with the transmission) is very large and the available time/bandwidth necessary is either unavailable or if it is available, such broadband systems are expensive. The alternative of trading bandwidth for time, results in a system which is too slow for many uses.

SUMMARY OF THE INVENTION

It is an object of some aspects of the present invention to transmit information from a plurality of remote sources without requiring that each of the transmissions be on a separate time/frequency channel.

It is an object of some aspects of the invention to provide a method of transmitting information from a plurality of remote stations wherein the information is contained in the presence or absence of a signal in a particular time and/or frequency slot and not in the identification of the particular station which transmits the information, in the transmission of an information bearing signal by the remote station and/or in how many stations transmit signals in the slot.

It is an object of some aspects of the invention to provide a method and system for determining "priorities" or "characteristic values" of a plurality of participants in accordance with one or more selection criteria and targeting those participants, if any, having the highest priority or the most suitable characteristic value.

It is a further object of some aspects of the invention to provide such a method and system wherein those participants having the highest priority or the most suitable characteristic value can be targeted in a short time.

Yet a further object of some aspects of the invention is to provide such a method and system wherein at least one of the targeted participants can be identified in order that a task can be allocated thereto.

Yet another object of some aspects of the invention is to provide an improved system for real time bus routing.

It is an object of some aspects of the present invention to provide a method of determining traffic delays in a road network based on transmissions from a large number of vehicles without identifying the vehicles and without receiving information associateable with a particular vehicle.

It is an object of some aspects of the present invention to provide a system for almost real time mapping of the positions of large numbers of moving stations with higher accuracy and with greater speed than prior art systems.

As used herein the term "priority" or "characteristic value" means, in addition to its normal meaning, a characterization according to a protocol which takes into consideration one or Ire elements associated with a person or object being characterized.

According to a broad aspect of the invention a call is broadcast or otherwise transmitted to a plurality of remote stations. Each of the plurality of stations determines a characteristic value or priority based on certain predetermined attributes of the station and broadcasts or transmits an indication signal during a communication slot which is indicative of the characteristic value, or preferably of a range of the characteristic value. In some aspects of the invention, more than one remote station will broadcast at the same time and frequency during at least a portion of the process.

In one embodiment of the invention, all of the stations broadcast or transmit at the same frequency, i.e., all of the slots have the same frequency and the time of the slot is determined by the range of characteristic values. In a second embodiment of the invention, more than one frequency is used for communication and both the time and frequency indicate the characteristic value. In a third embodiment of the invention, all of the stations transmit at the same time, and the characteristic value is indicated by the frequency of transmission only.

It should be understood that since more than one indication signal may be broadcast or transmitted at the same time and frequency, there is no identification of the responding stations, but only an indication of the characteristics (or rather ranges of characteristics, since each time/frequency "slot" generally represent a range of characteristic values) which characterizes at least one remote responding station.

It should also be understood that in many preferred embodiments of the invention, the transmitted information signals are "non-information bearing signals" in that the signals per se carry no information, only the slot in which the signal occurs carries information. Information about the identity of the transmuting station may not be of present interest or alternatively, in some applications, certain slots are used only by a given remote station, whereby the broadcasting station may be identified.

According to one aspect of the invention the characteristics are one or more priorities associated with the stations.

In one aspect of the invention a control center monitors the transmissions of the remote stations and determines which of the slots having an indication signal has the highest priority. It is convenient to order the response time period into time (or time/frequency) slots each representing a range of priority values preferably in descending order of priorities. Thus, the control center need only look for the earliest slot which contains an indication signal.

Having determined the highest range of priorities which are held by at least one remote station, a second call is preferably broadcast or otherwise transmitted asking for responses only from those remote units within this range. The time or time/frequency slots are now distributed, either by a predetermined protocol or specifically by the particular call, so as to cover this range of priority values.

The stations which have priorities within this range broadcast or otherwise transmit indication signals in response to the new call in the predetermined time or time/frequency slots. This process of determining the highest range of priorities and redividing the range continues until a given criteria is met. This stage of the process often termed herein the "targeting phase," (sometimes referred to herein as the "first phase" or "phase one") ends when the priority range ceases to be significant or the number of sub-ranges which are filled falls below a predetermined number based on the statistics of the total number of participating remote stations and the final range or priorities or where some other predetermined criteria is reached. At this point the number of station which are responding to the highest priority is believed to be small.

Before going on to the next stage it may be useful to estimate the number of stations which have responded to the highest priority. One method of making the estimate is by analysis of the data from the final step of phase one. A more accurate method of estimating the number of stations having the highest priority is to request each of these stations to transmit an indication signal at a randomly chosen slot over at least a portion of the entire range of time and frequency slots. Since the number of slots is now expected to be large compared to the number of stations, the number of slots which have signals is a good indication of the number of stations. An estimate of the actual number of responders is then based on the statistical relationship between the actual number of responders and the number of slots in which a signal is broadcast. If fewer stations are expected, only a single time slot may be used and only the frequency is chosen randomly by the stations.

The system then preferably initiates an "identification phase" (sometimes referred to herein as "second phase" or "phase two") starting with the broadcast or other transmission of an additional call requesting those stations within the highest (final) range of priorities found in the targeting phase to identify themselves. Each of the stations having a priority in this range broadcasts or otherwise transmits a signal including an identifier of the station or some other message at a slot which it chooses, preferably at random, from one of a plurality of such available slots. If only one station is expected to be within the range of priority values, then only one identification slot may be allocated. Other types of slots can also be used for the identification stage, such as coded spread spectrum signals, FDMA or CDMA. Additionally, multiple slots may be used for the same priority range to improve the reliability of detection in both the targeting and identification stages. The identification slots generally have an information carrying capacity which is larger than the slots used for indicating priorities since information (and not only an indication of the presence of a signal) is transmitted during the identification phase.

Since, when a plurality of remote stations are within the final range of values, it can be expected that more than one of the stations will respond in at least some of the slots, in which case their identification signal may be unintelligible. However, since the number of stations is relatively small, at least some of the slots will have only one identification signal. In general, the station having this signal is chosen since at this stage the difference in priority between the stations is generally unimportant. In some applications more than one identification signal may be broadcast in a particular slot, however, one signal may be clear. This station will then be chosen.

Alternatively, the stations which are left at this stage may be identified by assigning to each of the remote stations (including those which are no longer left, since the system has no indication of those which are left) a slot which is associated with only one remote station. All of the stations which are left after the previous stage are invited to broadcast in their identification slots. One or more of these responding stations is then chosen. Using this system of identification of the remote stations frees them of the need to transmit any information bearing signal, simplifying the system.

In another aspect of the invention the indication signal depends on the average velocity or delay of the remote station, which are generally vehicles. Systems which operate according to this aspect of the invention preferably broadcast a call to the remote stations which requests those stations having a delay above a given value or an average velocity below a given value to broadcast a signal indicative of their position. Such signals are then used to generate a map of those regions for which traffic is delayed or otherwise moving slowly.

Preferably, an additional call is sent to the vehicles requesting transmission of indication signals which position the slow moving or delayed vehicles at a higher resolution than that of the first call. Further calls may be made to allow for transmission of additional information on the status of the vehicles to provide further characterization of the delays.

In a preferred embodiment of the invention optimum routing of buses is made based on their positions along the route. In accordance with this embodiment, information on bus positions along the bus line is transmitted to a central dispatch station which calculates a new optimized schedule based on these updated situation reports. It should be understood that, while in general position is a two dimensional vector, the position of the bus along its route can be given by a single variable.

In a further preferred embodiment of the invention the position of a large number of vehicles can be mapped and tracked in near real time using a relatively narrow bandwidth. In this embodiment each vehicle is assigned a number of slots which are used only by that vehicle.

The vehicles must first be mapped in a preferred first, mapping, phase of the mapping and tracking procedure. In the first step of this phase, the total area of interest is divided into preferably nine areas, each of which is assigned a slot. The vehicle broadcasts a signal in the slot which corresponds to its present position. In a second step of the mapping phase, the area previously indicated as containing the vehicle is expanded to fill the nine slots. Alternatively, the area which is zoomed into the nine slots is slightly larger than the area of the previous broadcast to avoid a situation in which the vehicle was at the border of the area and left the area between steps.

This identification of one area and consequent new zooming and sub-division is repeated several times until the required resolution is achieved. The highest practical resolution, as will become clear below, is the distance that a vehicle could travel in the time it takes to perform a tracking cycle as described below. Within five iterations the individual resolution can be improved from 3.3 km to about 40 m.

In a, second, tracking phase of the mapping and tracking procedure, performed periodically after the required resolution is reached, preferably, nine slots, representing a 3×3 area of resolution areas, are used to track additional movements of the vehicle. The central one of the nine areas corresponds to the area occupied by the vehicle at the end of the mapping phase (or during a previous periodic updating iteration of the tracking phase). During each periodic update, each vehicle broadcasts in a slot which corresponds to either its previous position (the slot corresponding to the center area of the 3×3 group of areas) or one of the adjoining areas. In the next following iteration, the newly chosen area is the center of the 3×3 matrix.

In a further preferred variation of this embodiment of the invention, only 5 slots are utilized to map into the 3×3 area. One of these slots represents one of the corners (or the center) of the 3×3 area and the other 4 slots represent north south or east west variations.

In a further preferred embodiment of the invention, nine areas are represented by a four bit word which is sufficient to define the 3×3 matrix of elements.

In general, one or more base stations may be used for broadcasting calls and/or receiving responses from remote stations. If more than one base station is used, each station preferably performs a reduction of the data which it receives by either choosing its best candidate for performing the task or by performing a mapping function of its nearby region or of its associated vehicles. The base stations then preferably send this reduced information to a central base station which makes the final decision, constructs the desired map or performs any other final analysis. Furthermore, the central base station would, in a preferred embodiment of the invention, instruct each of the base stations as to which additional queries they should make. In this situation the subsequent queries need not be the same for all the base stations.

There is therefore provided, in accordance with a preferred embodiment of the invention, a method mapping of the characteristic values of a plurality of remote stations each having a varying attribute affecting a characteristic value computed according to a predetermined procedure comprising:

(a) assigning a plurality of transmission slots to each of the remote stations;

(b) determining, by the respective stations, of their characteristic values;

(c) initially broadcasting, by the respective stations, of their determined characteristic values in said plurality of transmission slots, said broadcast characteristic value having a first characteristic value resolution; and (d) subsequently broadcasting, by the stations, of their respective characteristic values in said plurality of transmission slots, said subsequent broadcasting having a finer characteristic value resolution relative to said previously broadcasted characteristic value having a first characteristic value resolution.

Preferably, (d) is repeated with successively higher characteristic value resolution until the characteristic value is broadcast with a characteristic value resolution. The higher resolution preferably twice, or somewhat less than twice the first position resolution.

In a preferred embodiment of the invention, a mapping space is divided into a fixed number of portions and wherein said initial broadcast indicates which of said portions contains the position. Preferably, the initially broadcast portion or a portion somewhat larger than the initially broadcast portion is divided into a fixed number of portions of a smaller size and wherein said subsequent broadcast indicates which of said portions of smaller size contains the characteristic value.

There is further provided in accordance with a preferred embodiment of the invention, a method of tracking a characteristic value of a plurality of remote stations each having a varying attribute affecting the characteristic value computed according to a predetermined procedure, comprising:

(a) assigning a plurality of transmission slots to each of the remote stations;

(b) determining, by the respective stations, of their characteristic values relative to a previously determined characteristic value; and (c) broadcasting, by the respective stations, of their determined characteristic values in said plurality of transmission slots, relative to the previously determined characteristic value.

Preferably the method includes iteratively repeating (b) and (c) wherein said previously determined characteristic value is the characteristic value determined in the previous iteration. Preferably, a characteristic value region surrounding said previously determined characteristic value is divided into a plurality of contiguous regions and wherein the relative characteristic value which is broadcast comprises broadcasting a signal in one or more of the transmission slots which indicates which of the regions contains the determined characteristic value. More preferably, the extent of the surrounding regions is established based on an expected maximum rate of change of the characteristic value in the remote station.

In a preferred embodiment of the invention, the previously determined characteristic value is determined in accordance with the mapping method.

A preferred embodiment of the invention includes repeating at least one step of broadcasting, at a coarser characteristic value resolution, when a valid signal is not received from a remote station during mapping or tracking.

In a preferred embodiment of the invention at least one step of broadcasting is repeated periodically to avoid accumulated errors in tracking or mapping.

In an especially useful preferred embodiment of the invention, the characteristic value is the location of a mobile remote station.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIGS. 16A–16C shows a scheme for slot distribution for tracking of individual vehicles.

DETAILED DESCRIPTION OF A PREFERRED EMBODIMENT

Figure 1:
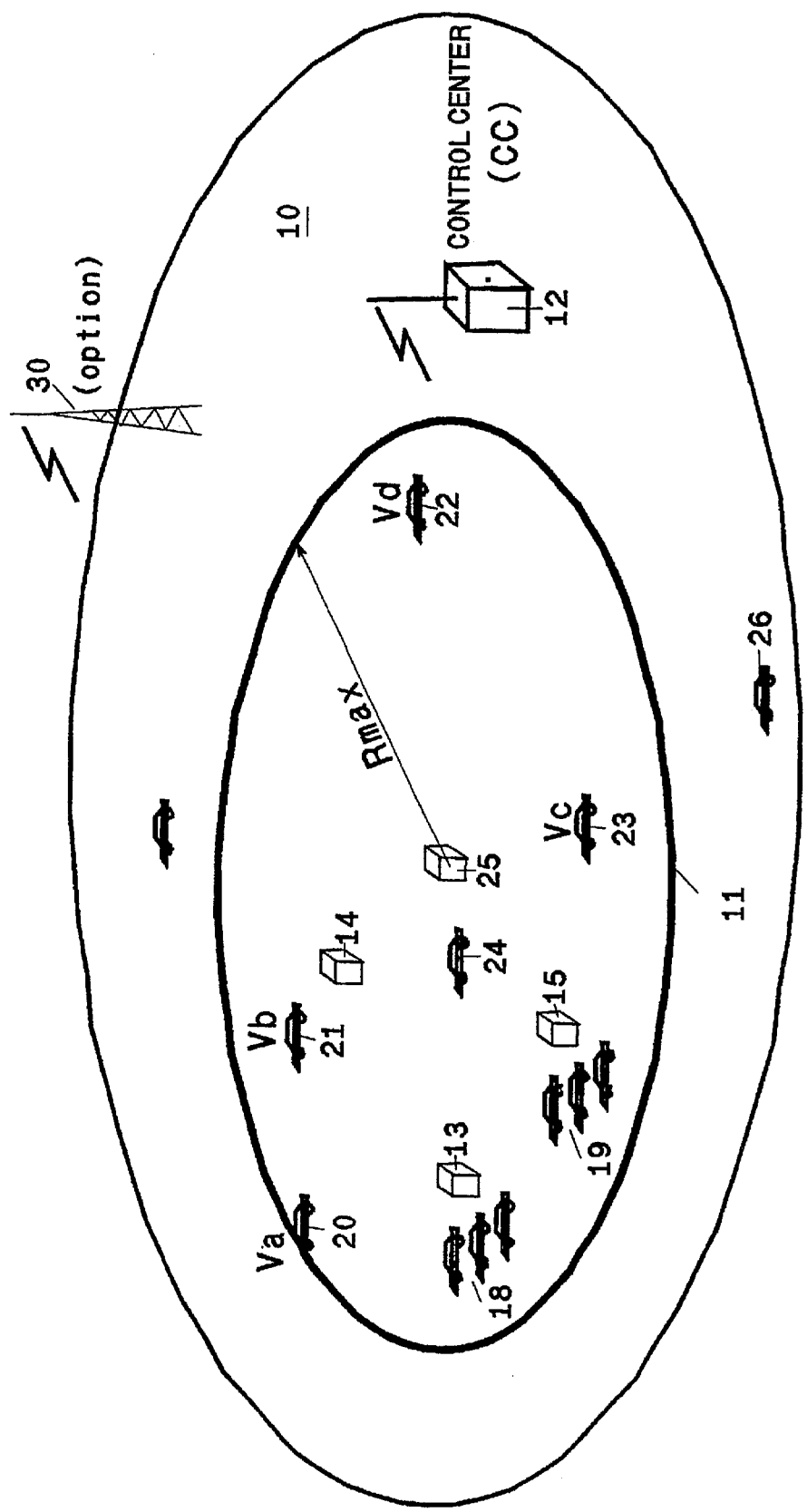
FIG. 1 shows schematically the principal components of a preferred system for carrying out a dispatching function in accordance with one preferred embodiment of the invention.

FIG. 1 shows a typical scenario of a dispatch situation in connection with which the invention may be employed. In this scenario a geographical area 10 is defined by a boundary 11 within which a system according to the invention is operational.

An identification system according to the invention includes a controller such as a control center (base station) 12 and, optionally, a plurality of taxi stands 13, 14 and 15 which constitute sub-control units each of which serves a respective region within area 10 and which may forward a customer request to control center 12.

Associated with each of stands 13, 14 and 15 are respective groups of participants (e.g. taxis) of which two groups 18 and 19 associated with stands 13 and 15, respectively, are shown in FIG. 1. The groups of participants 18 and 19 generally comprise some taxis which are stationary proximate their respective stands awaiting instructions therefrom and other taxis such as 20, 21, 22, 23 and 24 which are circulating within area 10 and are either available for performing a task on receiving instructions or, alternatively, are occupied and therefore unavailable.

A customer 25 located somewhere within area 10 relays a request for service to control center 12 telephonically via a Public Switched Telephone Network (PSTN). Control center 12, in turn, broadcasts an invitation message to all of the participants in area 10 either directly or via a remote station 30 which is typically located so as to cover all of area 10. Control center 12 can also receive messages via station 30. Alternatively, control center 12 broadcasts and receives messages directly.

Remote station 30 may be located inside area 10, or alternatively if the area is built up with tall buildings, outside the boundary of the built-up area, if this siting reduces the blocking of signals between the taxis and the repeater station by tall building and the like or for other reasons.

Sometimes, customer 25 telephones a particular taxi stand since this is the nearest stand to the customer's location. In this case it is generally preferable that one of the taxis associated with the taxi stand be dispatched to the customer unless, of course, all of the taxis associated with the stand are currently occupied (or otherwise unsuitable), in which case one of the taxis associated with another of the stands will be allocated for the task.

In this case, the association of a taxi with a particular stand may constitute at least one of the criteria involved in choosing the taxi to be allocated to customer 25. Such a selection criterion is a static variable and, once fixed, never varies because a taxi is always associated with one stand. However, the actual priority assigned to each of the taxis is also a function of several independent dynamic factors which are subject to constant fluctuation. Of these, the taxi's distance from the customer is the most important example. However, other dynamic conditions pertaining to a taxi's instantaneous status also affect the respective priority of the taxi so that, for example, a taxi which is currently occupied or one which has insufficient occupancy for the number of passengers to be collected would not participate in the selection process and a taxi which is waiting at a stand would get priority. The idle time of the taxi can also be an important criteria.

It will be appreciated that in general there are many different contributory factors, or selection criteria, which influence the priority assigned to each individual taxi within area 10. Moreover, it is generally the case that each selection criterion has a different "weight" associated therewith so that the final magnitude of the priority associated with each respective taxi is built up from many different selection criteria each of which exert a different influence on the actual priority assigned.

For example, in the simplest case, it may be that only distance from the taxi to customer 25 is of concern. Such a simple case would not take into consideration the fact that other customers may already have requested service and may not yet have been processed. Thus, another customer near customer 25 but still somewhat further away from the nearest available taxi in area 10, may have a prior claim for service. However, in the simplest of systems where only distance from the taxi to the customer is important, such a prior claim would not be recognized.

In a preferred system where many factors are taken into account the priority assigned to each taxi may often be viewed as a multi-dimensional vector which is the vector sum of component priority vectors each relating to a different selection criterion.

A preferred method for allocating a task to one of the taxis in response to a request by customer 25 will now be explained with reference to FIGS. 2 to 7. For the sake of simplicity of presentation only, it will initially be assumed that the only selection criterion of interest is the distance of a taxi from customer 25.

Figure 2:
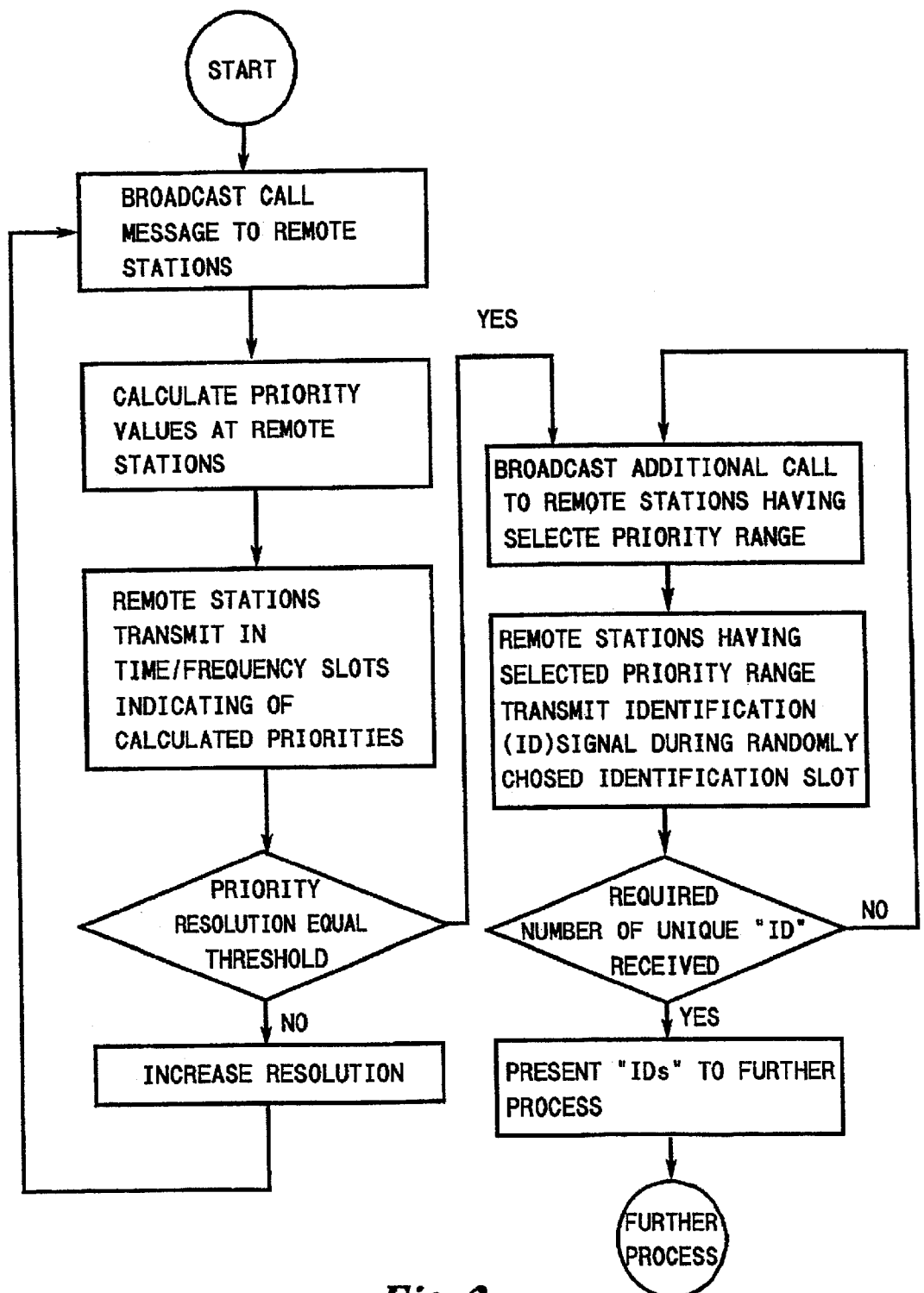
FIG. 2 is a flow diagram showing the principal steps associated with a preferred method of carrying out a dispatching function in accordance with the preferred embodiment of the invention.

FIG. 2, shows a flow diagram of the operation of a preferred system of the invention. The left portion of the flow diagram comprises operation of a first, targeting, phase and the right portion of the flow diagram comprises operation of a second, identification phase. The targeting phase starts with the broadcasting of a call message to all of the participating taxis informing them that a priority must be determined for responding to a pending request for service. The criteria for determining the priority may be sent together with the call or, alternatively, may be part of a preset protocol used for all such determinations. Alternatively, there may be several such protocols one of which the call identifies by a code. In the very simple case of a dispatching system wherein distance of a taxi from a specified location is the only selection criterion, there is no need to inform the taxi of the selection criterion each time an invitation message is transmitted.

Responsive to the call, each of the taxis uses the selection criteria to determine its own priority in accordance with the protocol. The protocol also includes a plurality of ranges of priority values and a communication protocol which subdivides a time period and/or a frequency range into a plurality of time or time/frequency slots each of which is associated with one of the ranges of priorities.

Each of the participants who is not immediately eliminated from further participation owing to gross unsuitability (e.g., they are already occupied or is already responding to a call) responds to the call message by transmitting an indication signal in the appropriate time or time/frequency slot in accordance with his respective priority. The indication time slots all start at a time relative to a time base common to all of the participants. It is important to note that for this embodiment of the invention all those responding participants having a priority within the same range respond at the same time and frequency. As a result, substantially simultaneous indication signals are received by the control center from those participants having the highest priority as determined at the current priority resolution according to the protocol. The indication signals, which are preferably pulsed CW (i.e., they are pulsed signals at a particular frequency having no information content other than that given by the time at which the transmission occurs and the frequency of the transmission), are sufficiently non-destructive with respect to other simultaneously transmitted indication signals and have at least sufficient pulse width so as to permit an indication that at least one of the taxis has responded in a given time slot. In certain cases it may be necessary to add some dithering or other variations to the signals so as to avoid destructive interference between the signals.

Since the indication signals may, and typically do, overlap, even a fairly narrow bandwidth broadcast channel may be employed, there being no requirement to discriminate between different indication signals in the same priority slot. Furthermore, intermodulation effects between the indication signals In a given slot are not important, since only the presence of at least one indication is required, and the intermodulation does not affect this determination.

The control center monitors any response and determines which slots have a true indicator signal (as opposed to noise or other transients). Preferably, the time slots are arranged in descending order of priorities, such that the control center may ignore all slots after the first one (or some other small number of) "occupied" slot.

The control center targets all those responding taxis having the highest priority range in respect of which a valid indication signal has been received. Except as will be described below, taxis having a lower priority are excluded from further consideration.

If a predetermined criteria for stopping the targeting phase has not been reached, then an additional call is broadcast requesting all those taxis which have a priority within the highest priority range to respond. The response of the taxis is similar to that sent in the previous step except that the time or time/frequency slots now represent sub-ranges within the highest indicated priority range or ranges. In general the call will include this range and may include an indication of the protocol for dividing the slots among the priorities.

It should be understood that, for the more general case of multiple criteria, the priority vector may be a function of the iteration number and/or the priority range. Thus for example, the first iteration may be used to eliminate taxis which are far away from the destination without giving much weight to the idle (waiting) time. The second iteration may give a greater weight to the idle time or to other factors. In general, taxis which have moved closer to the destination since the last call and have an increased priority may participate in the second iteration even if they did not have the highest priority in the previous iteration or were not detected as having this priority. Furthermore, a special slot (hereinafter also referred to as a "miss" trap) may be provided for taxis whose priority is now higher than the highest range detected in the previous iteration. These taxis would take precedence over the other taxis by using the special slot.

This iterative reduction of the number of participants continues until a predetermined criteria is reached. This criteria may include consideration of the priority resolution achieved. The criteria may include a statistical estimate of the number of vehicles which have not been eliminated. For example, if in a given iteration in which a substantial number of sub-slots have been allocated, only one or a few sub-slots contain a response, it is then fairly certain that the number of taxis left in the system is small (or even one) and the iteration process (and the targeting phase) is ended.

Another iterative approach which may sometimes be used is to restrict the responders in the first phase to a single range or a limited number of ranges. Assuming that the range of interest is between 0–10 km from the customer. A first call would only ask for responses from those taxis which are closer than 5 km from the customer. This distance could be divided into ranges or a single range could be used. If there were no responses, then the call would request responses from those taxis in the range of 5–10 km. If there were a response, then further delineation of the range would successively narrow the range of distances. In this method of restriction all positive responses to the query are preferably broadcast in the same time/frequency slot.

Preferably, in the targeting phase no participants are actually identified, and therefore it is not yet possible for the control center to dispatch a particular taxi to the customer. Before this can be done, it is first necessary to complete a second, identification, phase wherein one of the taxis targeted at the end of the first phase is uniquely identified.

An additional call is broadcast or otherwise transmitted to the participants indicating that an identification phase is to begin. All of the targeted participants remaining at the end of the first phase are invited to broadcast or otherwise transmit their identification codes in one of a number of identification slots (which may be time or time/frequency slots, DS-CDMA or FDMA slots). These slots have a duration (or information bandwidth) commensurate with the information to be transmitted by the taxis. The number of identification time slots is determined in accordance with the protocol and is application-dependent, and may be based on the number of participants which are believed to be (or estimated to be) left.

For example, in a dispatching system, the priority scale may extend from a distance of 10 km from the customer location and the initial priority resolution (so far as the distance criterion is concerned) may be 1 km which is reduced during two successive iterations to 100 m and finally to 1 m. At such a fine priority resolution it is not to be expected that more than a small number of taxis will be targeted so a fast converging identification phase having only a few time slots ought to be sufficient for identifying one of the targeted participants. It is not suggested that a 1 m distance is significant in determining priorities for taxis, however use of such fine distinctions aids in reducing the number of taxis which participate in the identification phase. However, as will be explained below, the protocol has built therein sufficient discrimination to allow for possible errors in the number of identification time slots allocated and to compensate for such errors as required.

The identification slots are preferably not assigned in any way, and the taxis choose their slots in some random way. It can be expected that at for least some of the slots more than one taxi will broadcast its identification information. Such broadcasts probably can not be read by the control center which will choose the first taxi which it can identify. If multiple dispatches are required to the same destination, as for example where there are too many passengers for one taxi, the second phase may have to be repeated several times until the required number of taxis are dispatched. Furthermore, in extreme cases, it may be necessary to call for identification from taxis having a lower priority.

As in the targeting phase, a slot may be provided in the identification phase for taxis having a higher priority than the call. These taxis may have moved closer to the destination or their signal may not have been received by the receiver due to interference or blockage.

Alternatively, the stations may be identified in an alternative embodiment of the identification phase in which a slot is assigned to each of the remote stations (including those which are not targeted, since the system has no indication of those which are left). All of the stations which are targeted are invited to broadcast in their identification slot. One or more of these responding stations is then chosen. Using this system of identification of the remote stations frees them of the need to transmit any information bearing signal, simplifying the system.

Having described the overall method for iteratively targeting, during a first phase, successively fewer participants and then, during a second phase, identifying a desired number of the targeted participants, there will now be described a specific application thereof to the scenario depicted in FIG. 1 and with reference to FIGS. 3 to 7 of the drawings.

Figure 3:
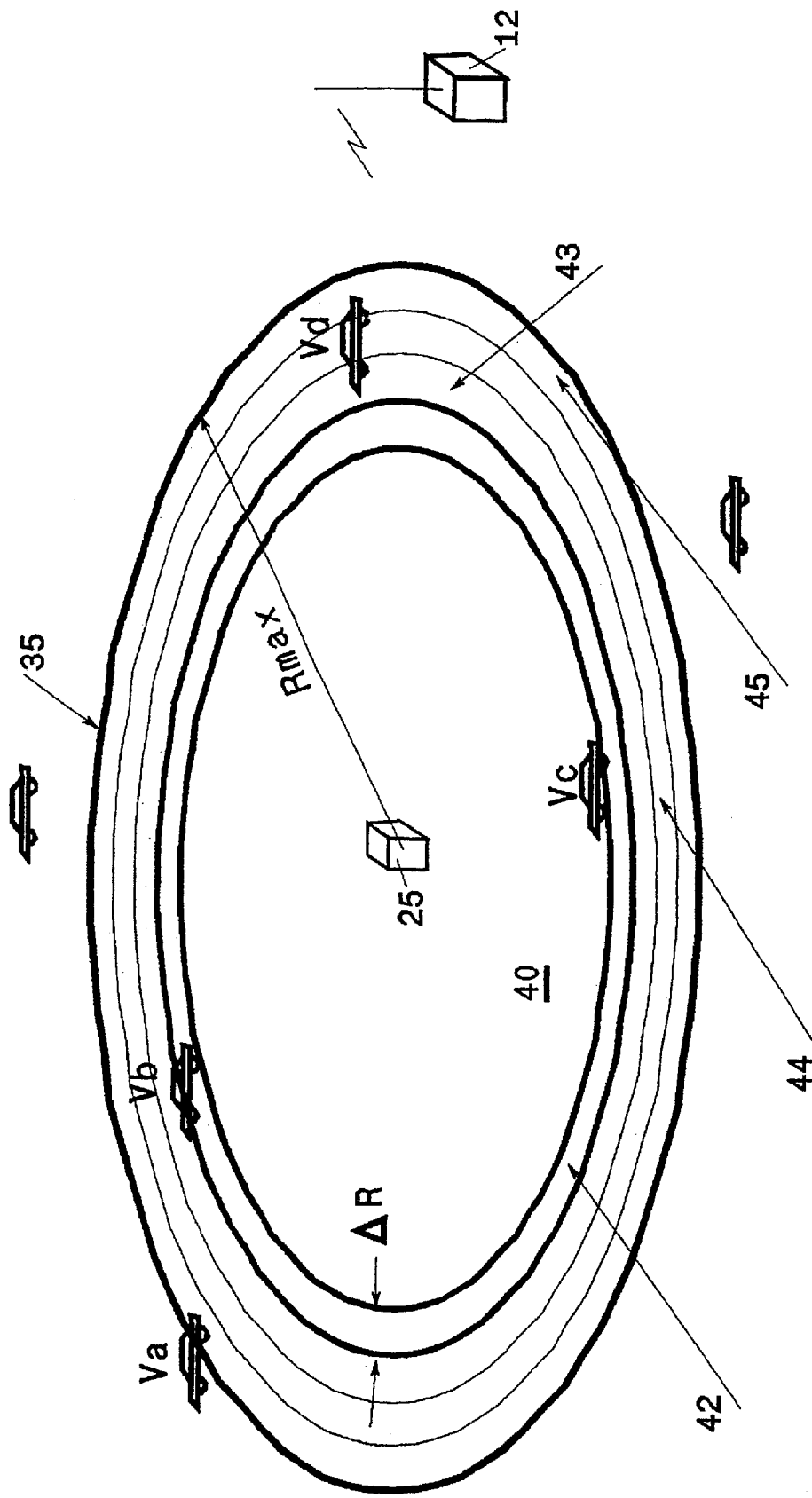
FIG. 3 shows schematically how vehicles are targeted during an initial phase of targeting based on distance from the customer location in accordance with a preferred embodiment of the invention for carrying out a dispatching function.

Referring then to FIG. 3, a customer 25 has requested a taxi. Shown within a circular target area 40 centered about customer 25 and having a boundary 35 at different distances from customer 25 are four taxi vehicles designated as $V_a$, $V_b$, $V_c$, $V_d$. Vehicles outside boundary 35 are excluded from consideration.

Target area 40 is split into a plurality of concentric sectors of which only the outermost sectors 42, 43, 44 and 45 are shown each having a width $\Delta R$ and being radially disposed with respect to the customer. Adjacent sectors 42 and 43 or 43 and 44 or 44 and 45 are contiguous although for the sake of clarity and explanation they are shown in FIG. 3 as separated from each other.

It will be noted that vehicles $V_b$ and $V_c$ are within the first (innermost) sector 42, vehicle $V_d$ is within the middle sector 44 and vehicle $V_a$ is in the last (outermost) sector 45. Since it is desired to allocate the task of servicing the customer to the vehicle which is closest to him, it is clear that one of the two vehicles $V_b$ and $V_c$ in the innermost sector 42 must be identified as the most suitable for the task. It will also be apparent that the number of vehicles which exist in any particular sector is a function of the width of the sector. Thus, if the width of each sector is increased from $\Delta R$ to $3\Delta R$, it is apparent that vehicles $V_b$, $V_c$ and $V_d$ will now exist in the new, innermost sector comprising original sectors 42–44. In this manner, the width of each sector $\Delta R$ constitutes a priority resolution with which a priority is assigned to the participating vehicles. The coarser (i.e. lower) the resolution, the more vehicles will answer the selection criteria and be rated at a particular priority associated therewith while the finer (i.e. higher) the resolution, the smaller the number of vehicles which answer the selection criteria and are rated with the corresponding priority.

Thus, after a first step of targeting in which a small group of taxis is chosen, in a second step of targeting the highest priority taxi, a coarse resolution (finer however than that in the first step) is set as shown in FIG. 3 and a call message is transmitted by control center to all of the participants. The call message also preferably defines a time interval $\Delta T$ which is divided into an equal number of time slots $\Delta t$ generally of equal width such that the total number of time slots is equal to the total number of priorities: i.e. the number of sectors. In a further preferred embodiment of the invention, frequency diversity can be used to define multiple slots at the same time, each of the slots being at a different frequency distinguishable by the control center.

Upon receiving the call message, each of the participating taxis determines its priority in accordance with the selection criteria, which, in the simplest case, is assumed to be solely the distance of the participant from the customer and within the maximum radius $R_{max}$. Thus, vehicles $V_b$ and $V_c$ are both assigned the highest priority, while vehicles $V_d$ and $V_a$ (in that order) are assigned successively lower priorities. It should be noted that typically there may be hundreds of vehicles in the target area 40; only a few are shown in the figure for the sake of clarity. Further, each vehicle may have a handset (see FIG. 9) having a disabling switch by means of which the driver can prevent the transmission of a response message upon receiving an call message from control center 12. By such means he can go off duty, etc.

The active participants $V_a$ to $V_d$ now transmit an indication signal within the time slot $\Delta t$ corresponding to their priority. Thus, vehicles $V_b$ and $V_c$ transmit an indication signal first; vehicle $V_d$ transmits his indication signal second; and vehicle $V_a$ transmits his indication signal third. In an actual situation, of course, there may exist many time slots corresponding to a large number of coarse resolution priorities and perhaps hundreds of vehicles will transmit an indication signal in the same time slot. This, in itself, is not important because all that matters during this first phase of the process is to determine the first time slot (or more generally, the slot representing the highest priority) in which a vehicle transmits an indication signal.

This having been done, it is immediately clear which is the nearest sector to the customer in which at least one vehicle is located and therefore all of the vehicles in all of the other sectors may now be eliminated. In a practical implementation of such a system, the broadcast and receive time for transmitting the call message from the control center to the participants and receiving the first indication signal therefrom takes a short time. Thus, in a relatively short time interval thousands of participants in the field can be reduced to a small number of potentially suitable participants for the task, without the use of excessive frequency spectrum.

Furthermore, if a full duplex communication system is used, the control center need not wait for the entire time $\Delta T$, and can go on to the next iteration or the next phase immediately when a first indication signal is received.

As explained above, this process is repeated iteratively as often as required, each iteration having successively finer priority resolutions (i.e. sectors of successively decreasing width $\Delta R$), until a predetermined resolution is reached. At this point, the width of the remaining sector is sufficiently small that only a small number of participants are likely to be found therein. It is, of course, not known how many participants there are in this remaining sector since regardless of whether only one participant or many send an indication signal in a particular time/frequency slot, the control center does not receive a message which is capable of uniquely identifying any one of those participants.

It should be noted that the receive time taken for the control center to process a response from the highest priority participants is a function of the number of time slots $\Delta t$. Thus, as the resolution is increased, there will be more time slots and, since each requires a minimum transmit time, it might take longer to identify the highest priority time slot. There is therefore a tradeoff between, on the one hand, increasing the resolution so as to identify the most suitable participant in fewer iterations and, on the other hand, increasing the cycle time of a given iteration by doing so. The choice of initial resolution and rate of increasing the resolution may be made based on the number of participating vehicles and or a priori expectations of the responses. Thus, the range of values of a priority which are assigned a given sector may be based on the number of expected units having that priority. If distance is the sole criteria, the range of distance values may be proportional to the distance so that the area of the sectors assigned to each priority may be the same.

Figure 4:
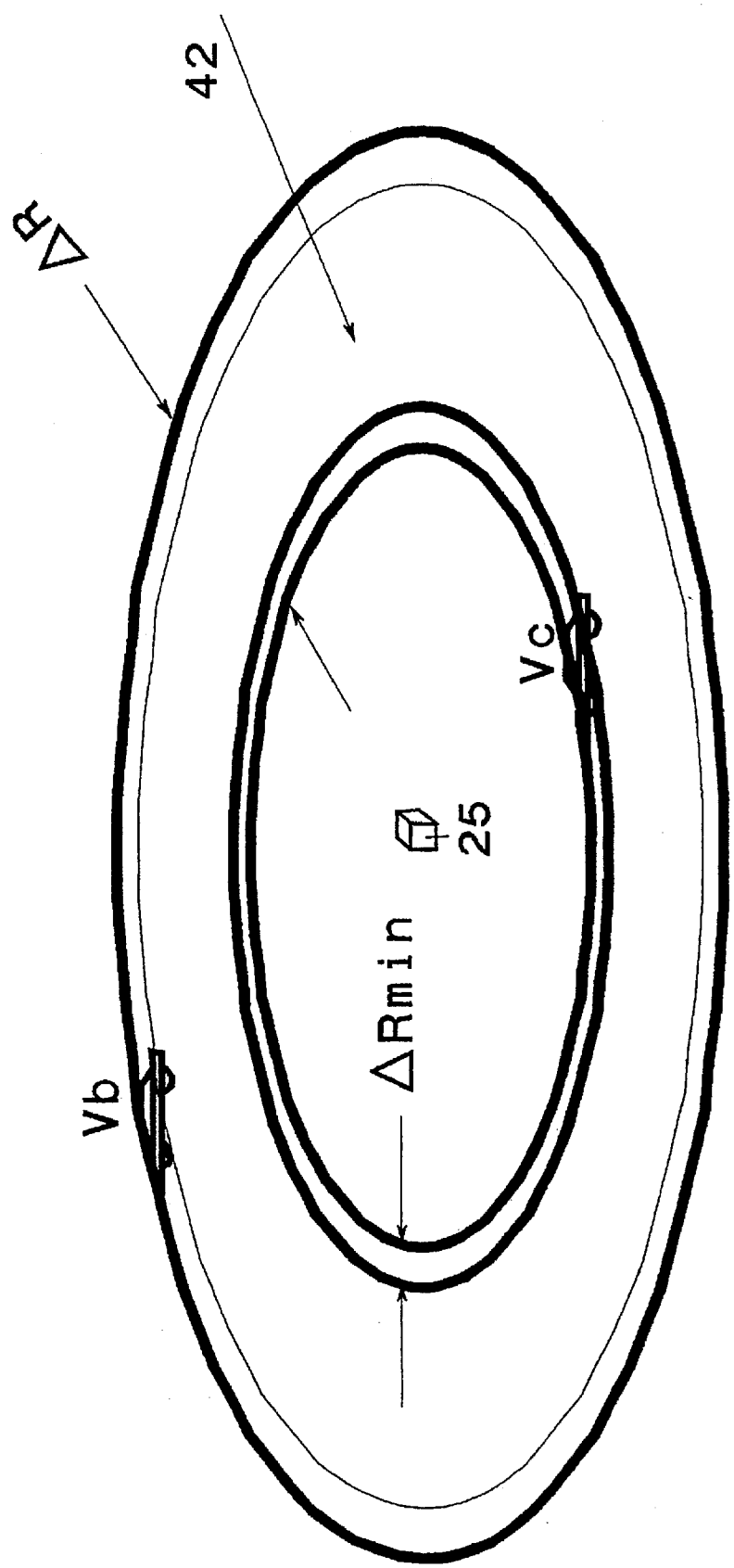
FIG. 4 shows schematically how vehicles are targeted during a second iteration of targeting based on distance.

FIG. 4 shows a subsequent iteration of the targeting phase wherein the priority resolution is increased and a further call signal is transmitted to the participants. The currently targeted participants $V_b$ or $V_c$ in what is currently the highest priority sector 42 are assigned new slots according to the finer priority resolution and again transmit indication signals during time slots corresponding to their priorities. As a result, it transpires that $V_c$ has a higher priority than $V_b$ and its indication signal is therefore transmitted first (or in a slot corresponding to a high priority, even if such slot is not first). However, from the perspective of the control center, there is no way of knowing how many participants exist in what is now the highest priority sector. All that can be known is that at least one participant has the priority.

Thus, while there may still be hundreds of participants in the targeted sector, it is expected that with the increased priority resolution only a small number of participants will now be targeted. One of these is now to be identified to respond to the request for service. During this second phase of identification, the control center assigns a new time interval ΔT-ID and divides this time interval into a number of equal width time slots Δt (or time/frequency slots) related to the expected number of participants in the highest priority sector 42. The expected number of participants in sector 42 is determined statistically as a function of the resolution of the sector ΔR and according to the application or according to the method described below. The only remaining targeted participant $V_c$ in the highest priority sector 42 now selects randomly one of the time slots and transmits, within the randomly selected time slot, an identification message whereby the sending participant can be uniquely identified.

In the more general case, where there are still a number of targeted participants, the control center receives a plurality of identification messages some of which may, of course, have been transmitted during the same randomly selected time (or time/frequency) slot. It is understood that where two signals are transmitted at the same time and frequency, no information on the identity of the transmitting participant is obtained in the absence of a capture effect. However, it is expected that at least one of the identification messages can be uniquely identified and, in this case, the task is allocated to a participant which can be identified. Where possible, of course, in the interest of speed, the task is allocated to the first uniquely identifiable participant.

If it is not possible to identify one of the participants uniquely, the communication protocol allows for appropriate priate action according to each particular situation. Thus, it may be that during the final iteration in phase one, no participants were targeted. This itself could be due to several different reasons: for example, the call message may never have reached the participants or, more likely, the response of the highest priority participants may not have been received, possibly having been obstructed by an obstacle in its path.

Alternatively, possibly too many participants were targeted in the final iteration of phase one and an insufficient number of identification time slots were allocated during phase two. In this case, identification messages may collide during all of the identification time slots, rendering it impossible to identify any one participant. In the more general case where more than one participant is to be identified, it may also occur that too few identification messages arrive in phase two owing to an insufficient number of participants having been targeted in phase one.

The various strategies for dealing with each of these possibilities from the point of view of the control center will now be described with reference to FIGS. 5–6B which show state diagrams relating to the targeting and identification phases, respectively. In both of these diagrams the following terminology is employed:

| | |
|---|---|
| PHASE-1.x | $x^{th}$ iteration of phase 1; |
| PHASE-2.x | $x^{th}$ iteration of phase 2; |
| IB | Control center's Broadcast Message; |
| RD | Responders' signal Detection and signal processing; |
| IBPH1.x | Control Center's $x^{th}$ Broadcast messages in Phase 1; |
| IBPH2.x | control center's $x^{th}$ Broadcast messages in Phase 2; |
| ΔTRTPH1.x | $x^{th}$ time interval for Responder's Transmission activity in Phase 1; |
| ΔTRTPH2.x | $x^{th}$ time interval for Responder's Transmission activity in Phase 2; |
| x | Number of iterations in Phase 1 or 2 (application-dependent); |
| NIP | Total number of iterations performed in current Phase; |
| Limit1, Limit2 | Application-dependent maximum number of iterations for Phases 1 and 2, respectively. |
| n | predetermined number of successful iterations |
| PS | Priority slot |

Figure 5A:
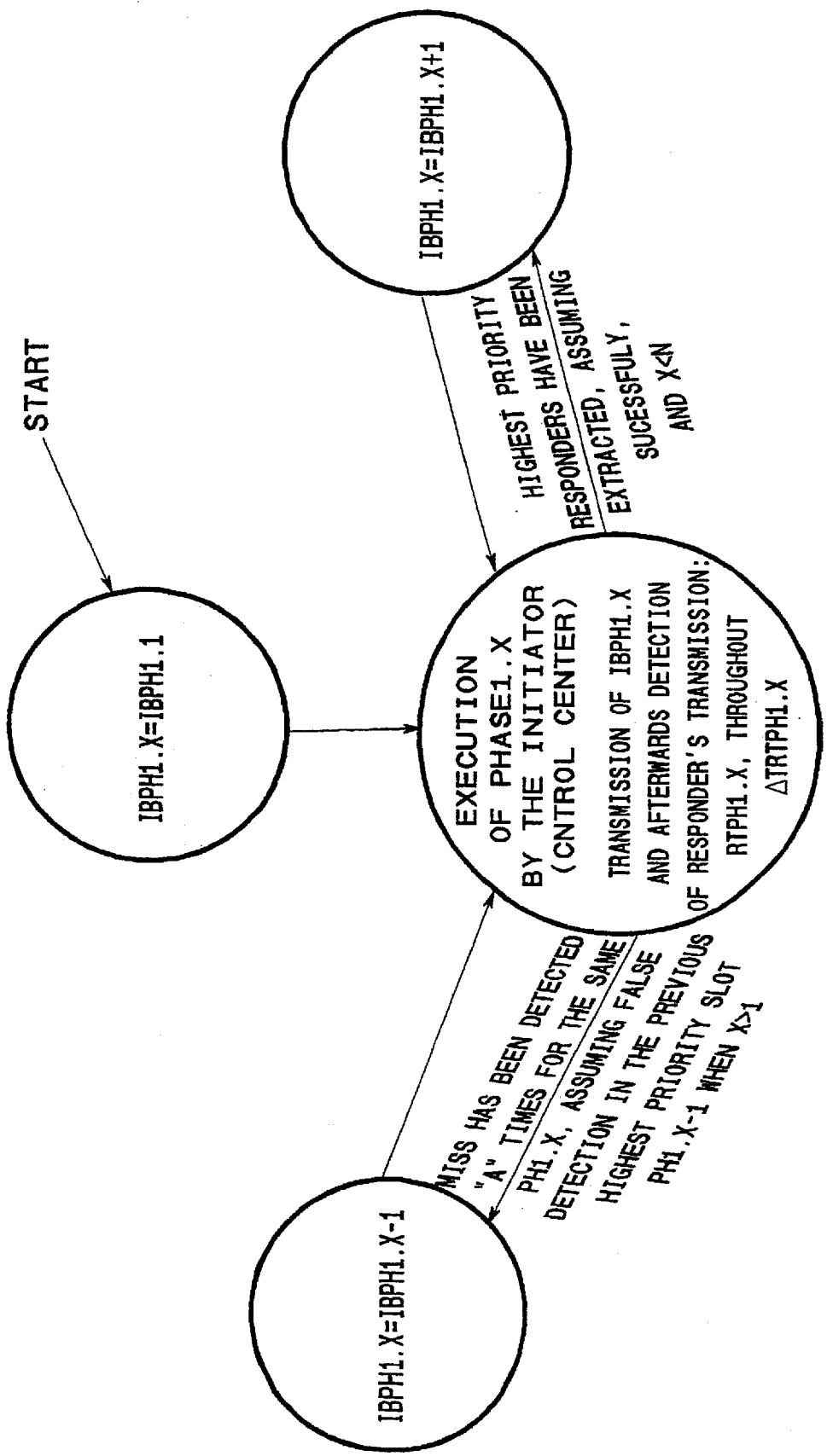
FIGS. 5A and 5B are two portions of a state diagram showing various options associated with a first targeting phase according to a preferred embodiment of the invention for carrying out a dispatching function.
Figure 5B:
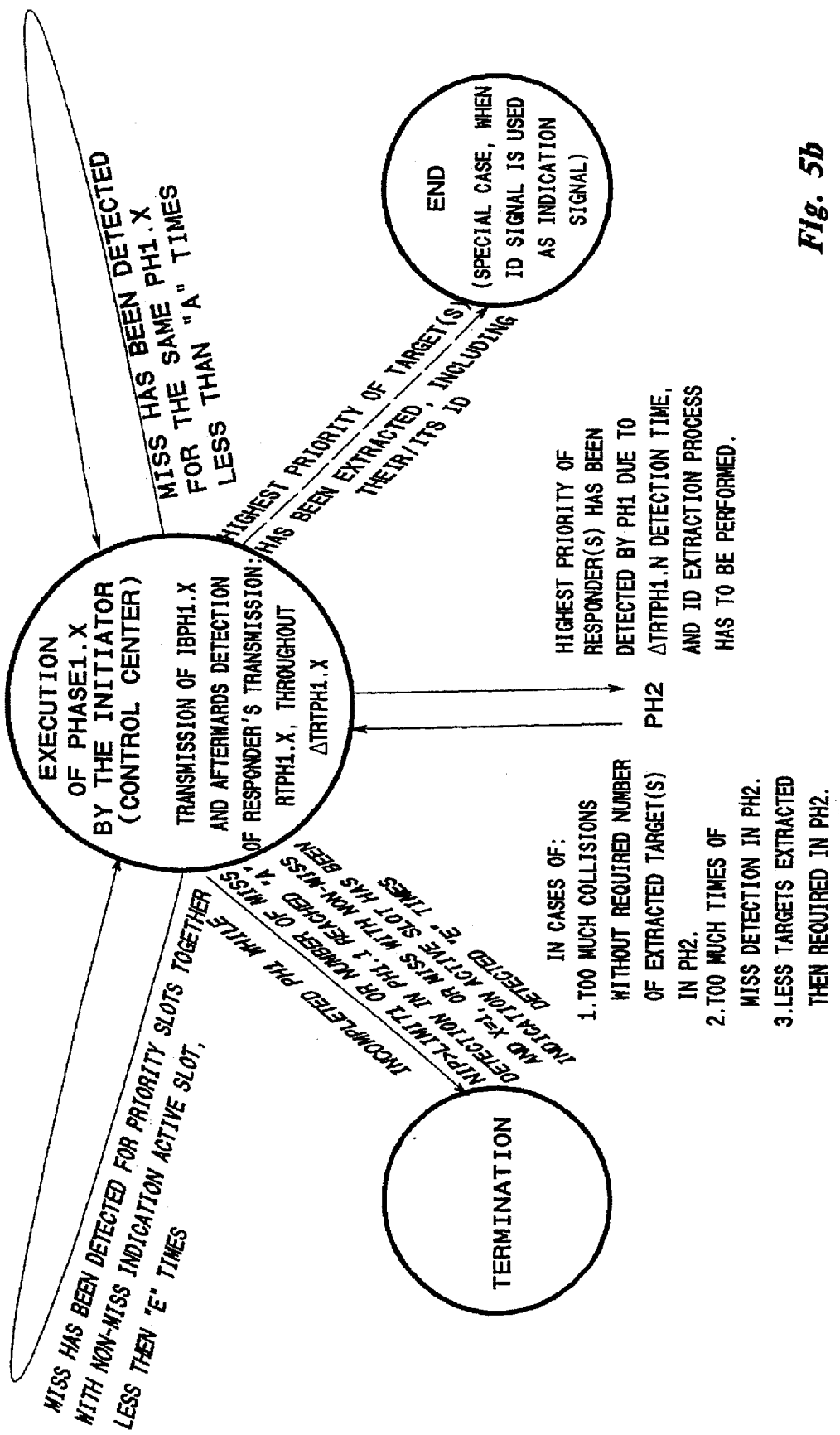

Thus, referring to FIGS. 5A and 5B, if during a successive iteration, no indication signal is received (i.e. a MISS is detected), the initiator requests at least once that all of the participants who have not yet been identified transmit a respective indication signal and this is repeated until an indication signal is received or for a maximum number of iterations determined in accordance with the protocol. Thereafter, whilst the resolution is higher than a minimum resolution determined in accordance with the protocol (and the iteration process has not been terminated for some other reason), further priorities having a coarser resolution are assigned to all of the participants who have not as yet been identified, or until the resolution reaches the minimum resolution.

Another way of checking if a MISS is true is to provide an additional slot during which all of those stations which should have broadcast during the designated priority slots will broadcast again. If no signal is received during this slot, the MISS is verified.

Figure 6A:
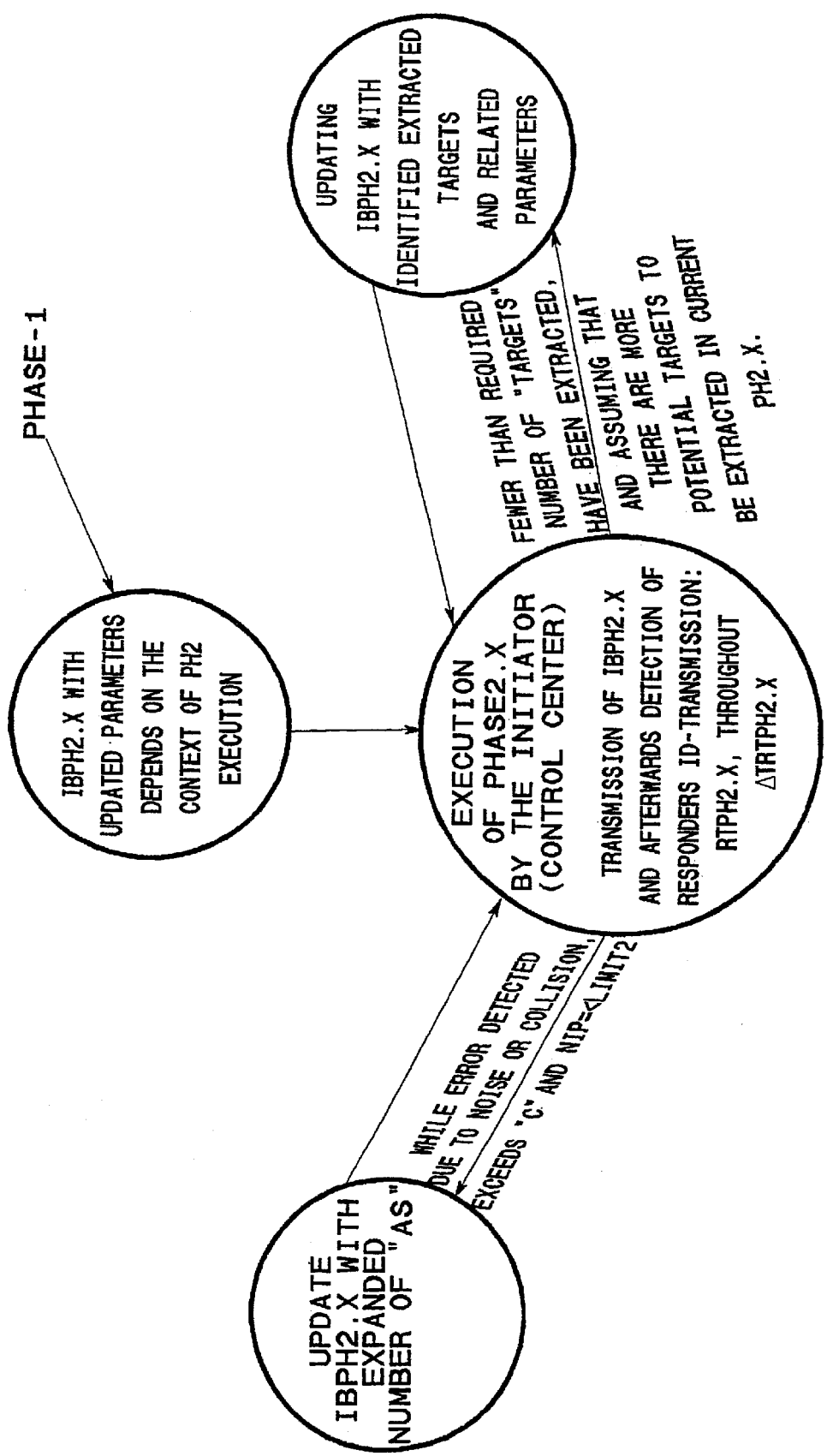
FIGS. 6A and 6B are two portions of a state diagram showing various options associated with a second identification phase according to a preferred embodiment of the invention for carrying out a dispatching function.
Figure 6B:
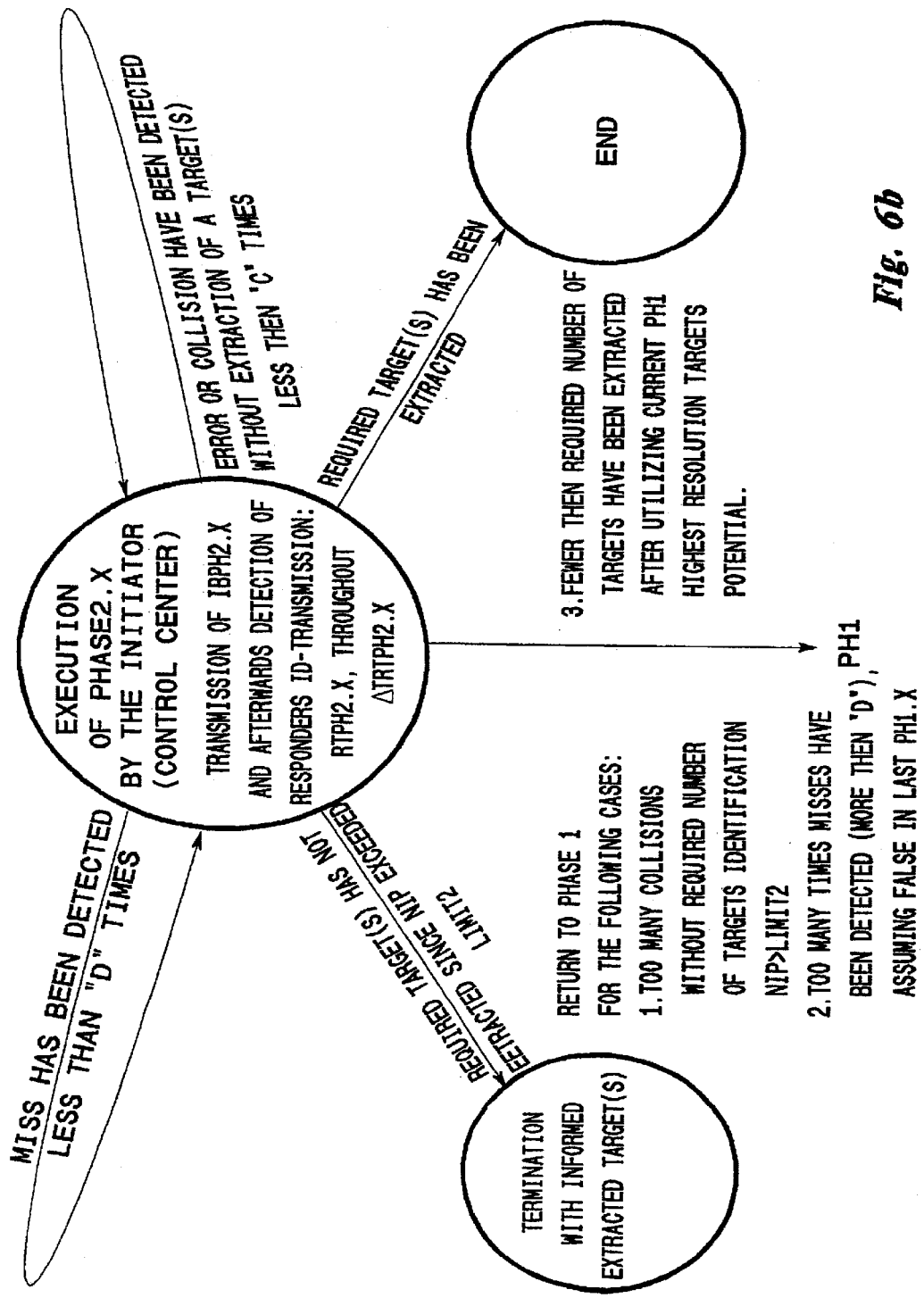

Referring to FIGS. 6A and 6B, if during any iteration no identification message is received by the control center and during preceding iterations fewer than the desired number of identification messages were received so as to permit identification of the respective participants or if invalid data were received, there is further included the step of the control center requesting at least once that any currently targeted participants who have not yet been identified re-transmit their identification message.

If fewer than the desired number of valid identification messages are received so as to permit identification of the respective participants owing to the occurrence of more than one identification message arriving in the same identification slot or to any other reason such as receipt of erroneous data, thereby rendering it impossible to determine the respective identifications, the following courses of action may be taken.

One possibility is for the control center to allocate to all of the targeted participants still remaining and who have not yet been identified a greater number of discrete identification time slots than the number previously allocated, and to invite the targeted participants who have not yet been identified to transmit a respective identification message during one of the new identification time slots. In other words, the number of targeted participants is maintained but more identification time slots are allocated so as to increase the probability that the desired number of valid identification messages will be received by reducing the probability of collisions.

Alternatively, the taxis can be required to choose a random number which can then be compared to some reference number to eliminate some of the taxis or which can be used in changing the priorities of the taxis to eliminate some of them. Alternatively, an additional criteria may be added to reduce the number of participants.

Alternatively, if the protocol allows a maximum priority resolution, then so long as the current priority resolution is lower than the maximum priority resolution, phase one can be repeated as required for a maximum number of iterations determined in accordance with the protocol at successively finer priority resolutions, until the maximum resolution is reached in respect of all of the participants who have not as yet been identified. This causes fewer participants to be targeted and again reduces the probability of collisions in phase two when any newly targeted participants are identified.

If, on the other hand, during a successive iteration, fewer than the desired number of valid identification messages are received so as to permit identification of the respective participants owing to an insufficient number of participants having been targeted during preceding iterations, then the opposite must be done. Thus, so long as the resolution is higher than a minimum resolution determined in accordance with the protocol, phase one is repeated as required for a maximum number of iterations determined in accordance with the protocol at successively coarser priority resolutions until an indication signal is detected or the minimum resolution is reached. This process is performed in respect of all of the participants who have not as yet been identified and, by targeting participants in phase one who were not previously targeted, increases the probability that the desired number of newly targeted participants will subsequently be identified in phase two.

If, during phase one, no indication signal is received in response to a call message, the control center requests at least once that the participants re-transmit an indication signal. On receipt of the call message, the participants assign themselves priorities and transmit respective indication signals during a corresponding indication time slot. This covers the possibility that the call message never reached the targeted participants or, alternatively, that their responses never reached the control center.

In all of the above cases, data is stored in respect of any participants who have already been identified and subsequent iterations are performed only to identify additional participants.

The protocol includes at least one termination condition whereby further iterations are not performed even if no indication signal has been received and/or if fewer than the desired number of participants have been identified. This is necessary to avoid an infinite loop being executed in the event that, in a particular application, there are not enough participants who can be identified.

Figure 7A:
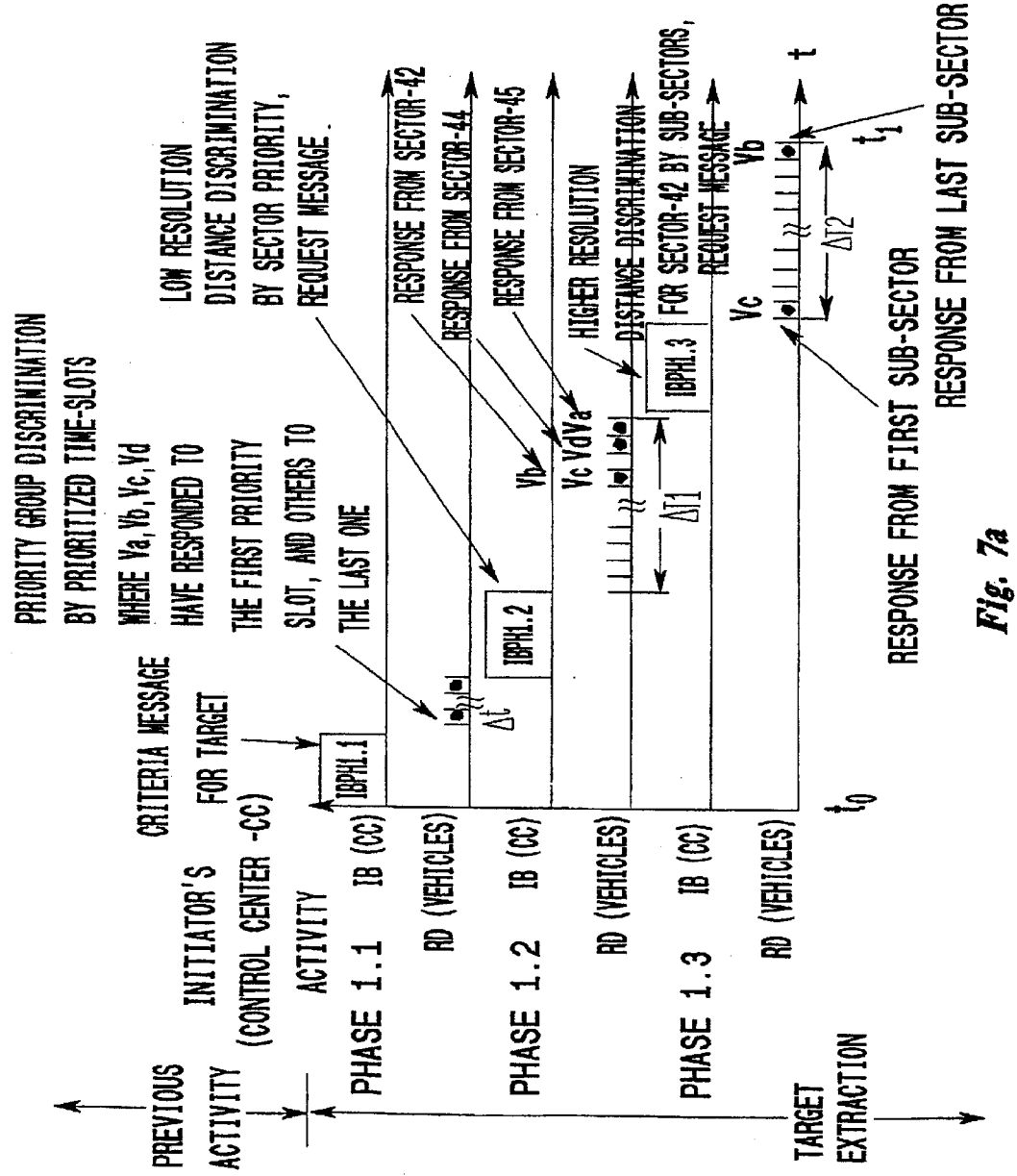
FIGS. 7A, and 7B show timing diagrams relating to the targeting and identification phases respectively of a priority discrimination according to a preferred embodiment of the invention for carrying out a dispatching function.
Figure 7B:
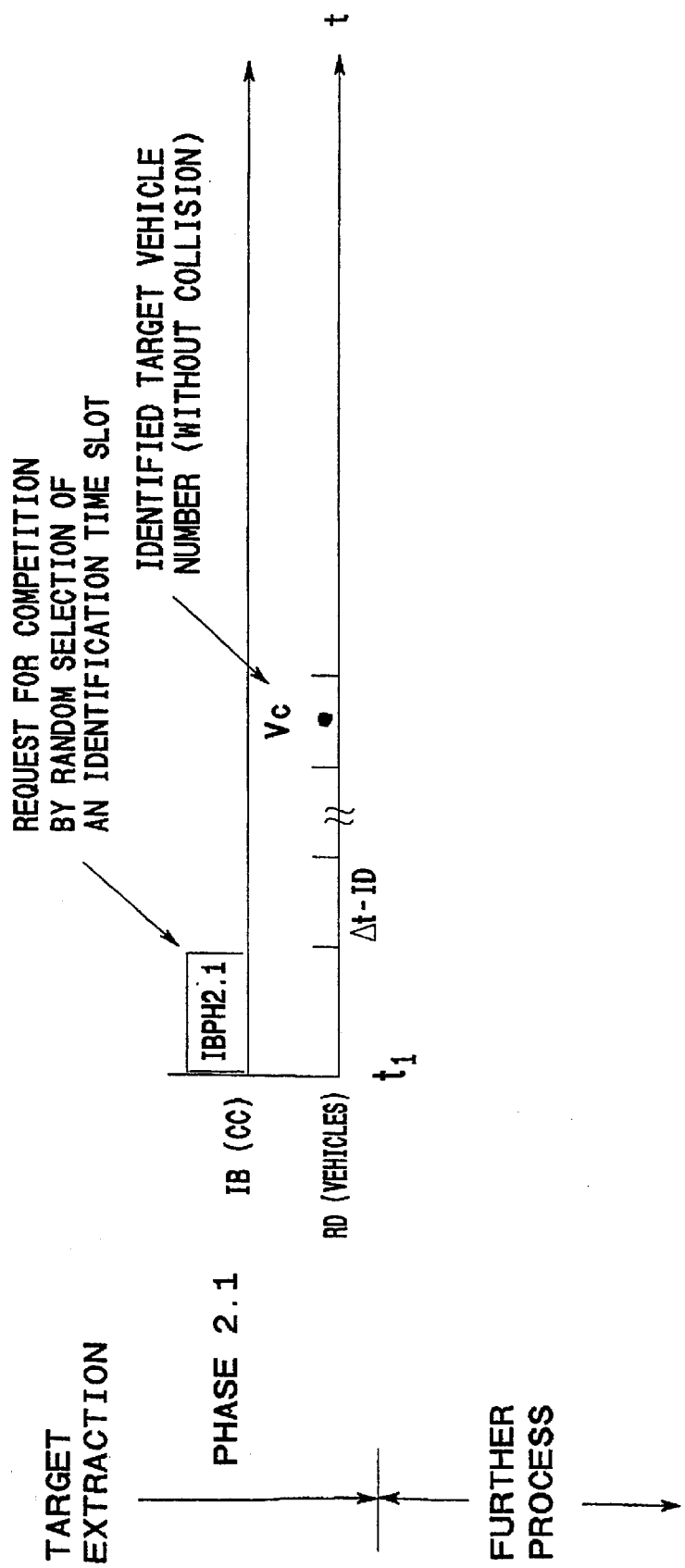

FIGS. 7A and 7B show a timing diagram relating to the flow of information between the control center and the participants $V_a$, $V_b$, $V_c$ and $V_d$ during the example of FIGS. 3 and 4.

It will be noted that in the initial phase of targeting, each participant selects a time slot according to his respective priority, such that participants with the highest priority transmit first. Consequently, as soon as the control center receives a response from the participants, the highest priority may be determined immediately in accordance with which time slot data was first received. Further iterations may now be effected, as required, there being no need even to await the responses of lower priority participants. This results in very rapid convergence of the targeting phase to the priority range containing the most suitable participant. This requires a full duplex system. FIGS. 7A and 7B show the timing diagram for a half duplex system.

In another embodiment of the invention priorities may be assigned according to a measured elapsed time since participants have performed some activity. For example, priorities are assigned to taxis according to the time they have been idle.

In a first iteration of phase one, the mutually common priority scale relates to an elapsed time of say 3 hours and the priority resolution is say one-half hour. Thus, each interval in the priority scale corresponds to an elapsed time of one-half hour.

In a second iteration of phase one, the mutually common priority scale relates to an elapsed time of one-half hour and the priority resolution is 2.5 minutes. Thus, each interval in the priority scale corresponds to an elapsed time of 2.5 minutes. If during the first iteration a signal was received in the time slot of two to two and one-half hours, then the time slots in the second phase may have a resolution of 2.5 minutes and span the range between these limits.

If this is considered to be sufficiently fine so that not too many participants will have the same priority, the process is terminated after only two iterations. It is now appropriate to implement phase two wherein one of the targeted participants is identified.

It will be understood that since, during the identification phase, a participant may be, in effect, selected randomly, it cannot be assured that the identified participant is actually the one who has waited the longest. However, it can be said with certainty that the identified participant has the highest priority to within the priority resolution (in this case 2.5 minutes).

If, notwithstanding the above expectation, it becomes impossible to identify a single participant in phase two owing to too many participants having been targeted during phase one, then, as explained above, several options are available. More identification time slots can be allocated in phase two or, alternatively, a further iteration in phase one can be performed at an even finer priority resolution, for example 6 seconds, before repeating phase two in respect of a smaller number of targeted participants or one of the other options described above may be employed.

In all of the embodiments described above, at least two phases are required to identify a targeted participant. Thus, during a first phase, participants are only targeted and are identified during a subsequent second phase. However, according to another preferred embodiment of the invention, provision may be made for identifying a participant during the first phase by transmitting an identification message as the indication signal. The identification message can be decoded in the particular circumstance that only one participant has the highest priority, so that only one indication signal is transmitted in the highest priority time slot, and there is a sufficiently long time interval between receipt of successive indication signals by the control center to allow decoding of the identification signal before a lower priority indication signal arrives in a subsequent indication time slot. Alternatively, the identification time slots are made long enough so that different slots have minimal or no overlap. In this particular case, the second phase of identifying the targeted participants is eliminated. It should be noted that, generally, this embodiment of the invention is less efficient than the embodiment which uses non-information bearing signals in a first, targeting, phase to reduce the number of vehicles in a second, identification, phase.

Yet a further consideration relates to the possibility that the highest priority participant may not be targeted in phase one owing to a malfunction. Thus, for example, his indication signal may not be received, having been obstructed by an obstacle in his path or his signal is subject to fade. This may not matter if other participants having the same priority have nevertheless been able to transmit indication signals, since if the indication time slot having the highest priority is determined and all the participants associated therewith are targeted, even a participant whose indication signal was lost will still be targeted. However, if a sole participant's indication signal is lost this could prevent correct determination of the highest priority participant.

The protocol can take this possibility into account by reserving, preferably, the first indication time slot in the next iteration for exclusive transmission therein by a non-targeted participant having a higher priority than that of the targeted participants. The control center then transmits a call message inviting the targeted participants to transmit a respective indication signal during any one of the indication slots except the reserved indication slot.

So far as newly targeted participants are concerned, the process is essentially unchanged; each of the newly targeted participants transmits an indication signal during one of the unreserved indication slots according to his respective priority. However, any previously non-targeted participant having a higher priority than that of the newly targeted participants transmits a respective indication signal during the reserved slot. This slot is referred to herein as an "Inter-Iteration Miss/Trap Control Slot."

In a further preferred embodiment of the present invention, at least one iteration of the targeting phase includes a control slot, which is reserved for simultaneous transmission by all the priority-bearing participants of the iterative stage responding to the call sent from the control center. According to this preferred embodiment, each priority-bearing participant transmits twice, once during its characteristic-indicating slot as described above and once during the control time slot. This control slot is referred to herein as an "Intra-Iteration Miss/False Control Slot." This control slot provides an independent indication of transmission by at least one participant in response to the control center call which initiated the iteration.

The additional indication obtained from the Intra-Iteration Miss/False Control Slot will generally economize on both the total processing time and the total transmission time of the targeting phase. For example, if no transmissions are received in this control slot, it may be assumed that any transmissions received in the characteristic-indicating slots are due to a false alarm error and, thus, further processing and transmissions derived from the last iteration are avoided. Similarly, in a "miss" error situation in which no participants are targeted, a transmission received in this control slot indicates a possible "miss" and the last iteration is preferably repeated. Thus, the use of a control time slot improves the reliability of the targeting phase.

It should be noted that for improved reliability of the detection process at the control center receiver, the remote station transmitter may perform a more sophisticated transmission process that includes diversity techniques based on randomly varying the amplitude and or the phase of the transmitted signal, so that any correlation between transmitters will be reduced when detecting a sequence of transmission slots.

To further improve the reliability of the targeting phase, a preferred embodiment of the invention employs a majority voting techniques in which an odd number of slots greater than one, for example three slots, are assigned to each range of characteristic values. According to this preferred embodiment, each participant of a given characteristic value transmits an indicating transmission during each of the time slots assigned to the range. The given characteristic value is taken into account only when indicating transmissions are received in a majority of the slots assigned to the value, for example by two slots out of three. When indicating transmissions are received only by a minority of the slots assigned to the value, for example by one slot out of three, the response is preferably ignored. It should be appreciated that the odd number of slots assigned to the given range of characteristic values may be distributed among slots that have minimum correlation.

It is appreciated, however, that such majority voting schemes which improve the over-all reliability of phase one, consume substantial transmission and processing time. Therefore, such schemes are preferably applied selectively, in potentially problematic situations. For example, majority voting may be employed only after a predetermined number of previous false alarms and/or "misses" have been detected using the control slot technique described above or otherwise.

Within a single iteration of phase one, the assignment of priorities to each participant may be performed in respect of a different sub-set of selection criteria for at least some of the participants. In effect, this permits different search strategies to be executed each in respect of a respective indication slot. For example, the first indication slot having the highest priority may relate to all participants who are located within a radius of 10 m from the customer without any further restriction; whilst the second indication slot may relate to all participants who are located within a radius of 25 m and who have been awaiting instructions for more than 20 minutes. By this means Boolean OR search or other search strategies can be performed in a single iteration.

Furthermore, during each iteration the participants may optionally assign themselves a priority having a magnitude outside the priority scale so as not to be targeted by the initiator. This can be done if, for example, a participant is otherwise occupied or for any other reason does not wish to receive instructions.

During a particular iteration the priorities assigned to each participant are generally absolute with respect to a mutually common scale which itself is external to the participants and independent thereof. However, between successive iterations the priority scale may well relate to different combinations of selection criteria. By this means finely tuned search strategies can be performed whereby all participants answering to a first combination of selection criteria are targeted during a first iteration, whilst all of the targeted participants answering to a different combination of selection criteria are targeted during a successive iteration.

Alternatively, the combination of criteria which make up the priority may be information dependent and, for example, different groups of slots may relate to different combinations of criteria.

Once a sufficiently small number of participants are targeted such that, in accordance with the protocol, identification of a desired number of participants is likely to yield a successful outcome, the second phase described above is commenced. The number of identification slots to be allocated to the targeted participants is calculated by first estimating the number of targeted participants remaining at the end of phase one. The number of identification slots is then calculated according to the estimated number of targeted participants who must transmit respective identification messages, so as to reduce the total time required to identify the required number of participants.

In this connection, it will be realized that there exists a tradeoff between allocating too many and too few identification time slots. Specifically, allocating too many identification time slots reduces the probability of a targeted participant selecting an early identification slot, thereby increasing the time required to identify the highest priority participants. On the other hand, allocating too few identification time slots increases the probability that more than one participant will select the same identification time slot. In this case, the resulting collision of more than one identification message makes it impossible to identify the respective participants, requiring further iterations and again increasing the identification time. In practice the number of identification time slots may be minimized by increasing the maximum priority resolution in phase one in order to target no more than the expected number of participants who are to be identified in phase two, or by using a random process to eliminate some of the participants, such as that described above.

In the specific embodiments described above the process of assigning priorities to each of the participants is performed within the participating vehicles themselves since only they know their locations relative to the customer. Moreover, the onus of tracking the participants' movements in terms of their location, availability, occupancy, loading and all the other selection criteria which may be of significance is now passed to the participating vehicles themselves as opposed to most hitherto proposed systems wherein a central dispatcher had to keep track of all these parameters.

As a result of the above, the communication channel between the control center and the participants may be of relatively narrow spectrum width compared with that of hitherto proposed systems. Additionally, the task of targeting potentially suitable participants is distributed amongst the participants themselves rather than being determined solely by the control center. Such distribution results in a reduction of computing power being required by the control center.

While the selection criteria must obviously be known to the participating vehicles, the manner in which this is made known can be varied according to circumstances. Thus, for example, the selection criteria may be fixed and known in advance to the participants (in which case the selection criteria are not subject to change). Alternatively, the selection criteria may be determined on-line by the control center and then transmitted to all of the participants together with the call message.

Thus, in the particular example described above, during the first phase of targeting it may be predetermined that each sector has a width of 10 km and that in subsequent phases, the width of each remaining sector is reduced, for example, by a factor of 10 until the sector has a width of only 10 m, whereupon all those vehicles within the 10 m width sector send an identification message; or, alternatively, the width of each sector in each respective phase of allocation may be transmitted to the participants by the control center. In order to reduce the number of participants in the identification phase, the resolution in the targeting phase may be increased artificially, i.e., past the point at which it is meaningful.

It should also be noted that once a particular participant has been uniquely identified to perform a task, he is notified of this in the normal way by the control center, in any one of a number of ways which are well known in the art as for example, by voice over a communication channel or by text or other data transmission.

Furthermore, although in the preferred embodiment described above, one participant is uniquely identified as the most suitable, in fact it may sometimes be appropriate to omit the second phase of identification altogether. In such cases, the participants having the highest priority are not uniquely identified as individuals but all are identified as a group. One such situation relates to an improvement of service in particular areas. In this situation the number of taxis in a given area is monitored and additional cars are sent in to the area if there are not enough cars in the area. The number of cars may be estimated statistically, for example, from the number of slots having responses.

In a further preferred embodiment of the present invention, the number of participants complying with given criteria is estimated based on a down-sampling technique in which only a portion of the complying participants actually respond to a call from the control center. For example, the participants may be assigned a given response probability such that only a given percentage, for example ten percent, of the complying participants respond to the call. Response time-slots are preferably randomly selected by the different participants. If the number of response slots is substantially greater than the number of responses, i.e. the number of complying vehicles times the response probability, the number of detected responses generally corresponds to the number of responses which, in turn, is a down-sampled indication of the number of complying participants.

Down-sampling is particularly useful for situations in which the number of expected responses is high, such as for estimating the number of vehicles in a given area, when very course selection criteria are applied. On the one hand, in such a case the number of responses is large enough to be statistically reliable, provided that the number of responders is small enough compared to the number of slots dedicated for this purpose. On the other hand, the smaller number of participants transmitting simultaneously reduces the total transmission power and, thus, prevents occasional bursts of powerful transmission which may be in violation of FCC co-channel interference or other regulations.

Another application of the system of priority assignment according to the invention is in the assignment of available lines for car-phones or transceivers. Presently, available lines are allocated on a when available basis. Thus, one unlucky user may wait a long time while a lucky user may get an immediate line. In a preferred embodiment of the invention, when a user wants a line, he indicates this either by pressing a call button or by lifting his receiver. A computer chip associated with the car-phone notes the time at which a line was requested.

Lines (communication channels) are allocated on a waiting time basis. In operation, a control center broadcasts a call for priorities in accordance with a targeting phase of the present invention. The priority is assigned according to waiting time, and the individual phones broadcast signals during time slots assigned according to their waiting time or by some other special priority. During a second identification phase one of the phones is identified, in the same manner as described above, and is given the available line.

Figure 8:
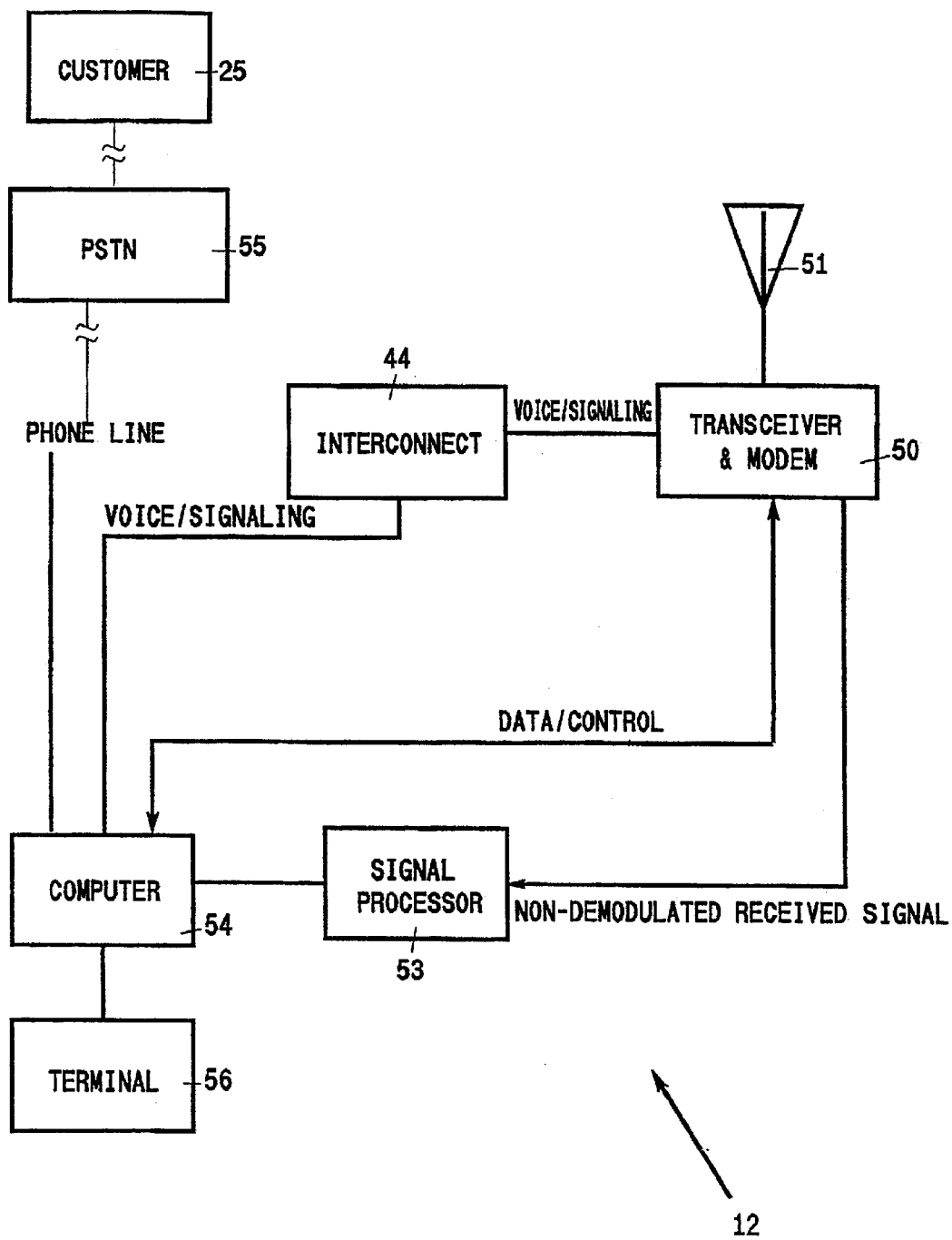
FIG. 8 is a block diagram showing the principal components in a control center according to a preferred embodiment of the invention for carrying out a dispatching function.
Figure 15:
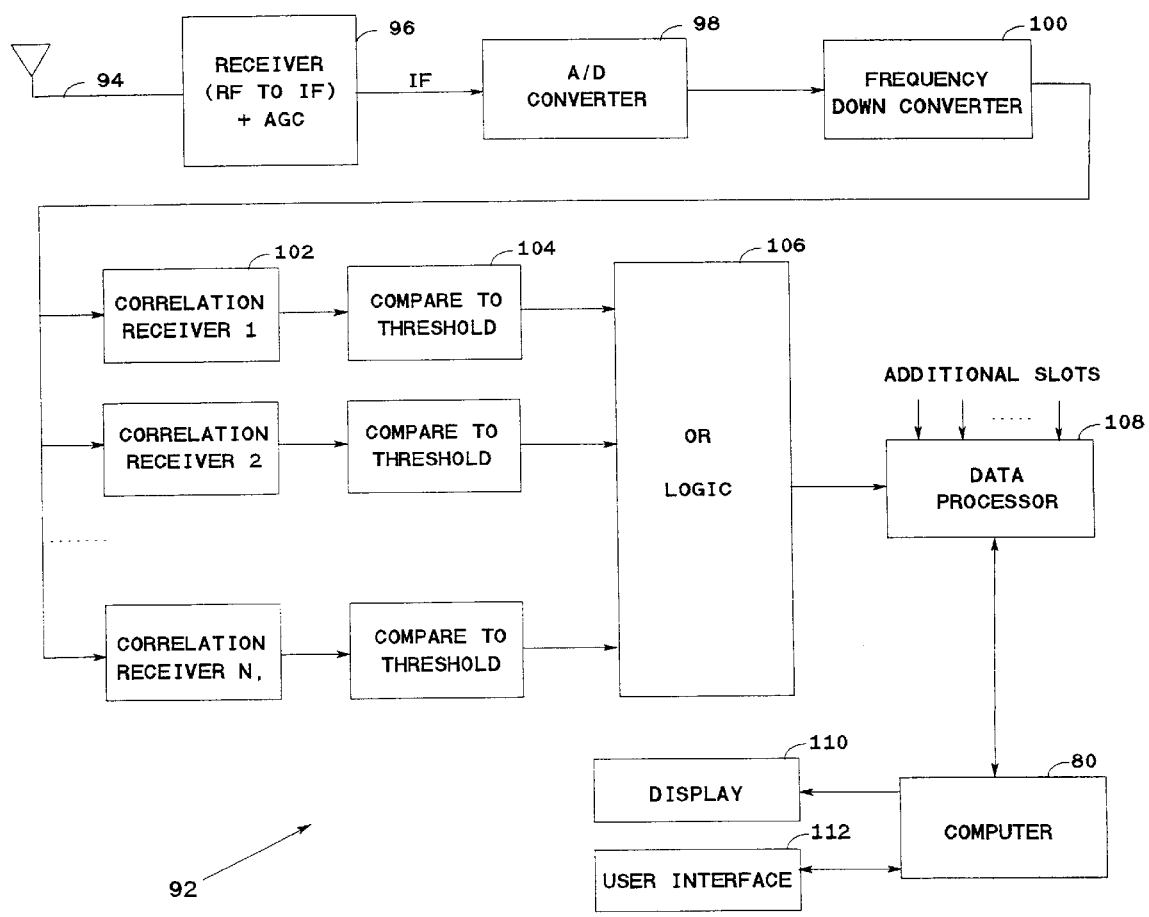
FIG. 15 is a block diagram of a receiver for useful for both IVHS and dispatching systems in accordance with a preferred embodiment of the invention.

Referring now to FIG. 8 there is shown schematically the principal features associated with the control center shown in FIG. 1. Thus, there is provided a transceiver and modem 50 coupled to an antenna 51 for effecting bi-directional communication with the participants (taxis) and being connected to a message processor 53 which is coupled to a computer 54. Message processor 53 receives non-demodulated signals from the transceiver and determines which slots contain signals for the targeting phase and identifies the participant(s) in the identification phase. A preferred embodiment of such a receiver is shown in FIG. 15.

A service request is effected by customer 25 by telephoning his nearest taxi rank and then dialing his telephone number, the request being routed to the computer 54 via a Public Switched Telephone Network (PSTN). The computer 54 converts the customer's telephone number to a corresponding location based on a data base stored in the computer. Alternatively, such communication can be effected via an operator. A terminal 56 is coupled to the computer 54 for allowing an operator to enter commands and display data. In addition the system also allows for voice signaling to a dispatcher at the control station or for voice communication between the taxi driver to the customer.

Figure 9:
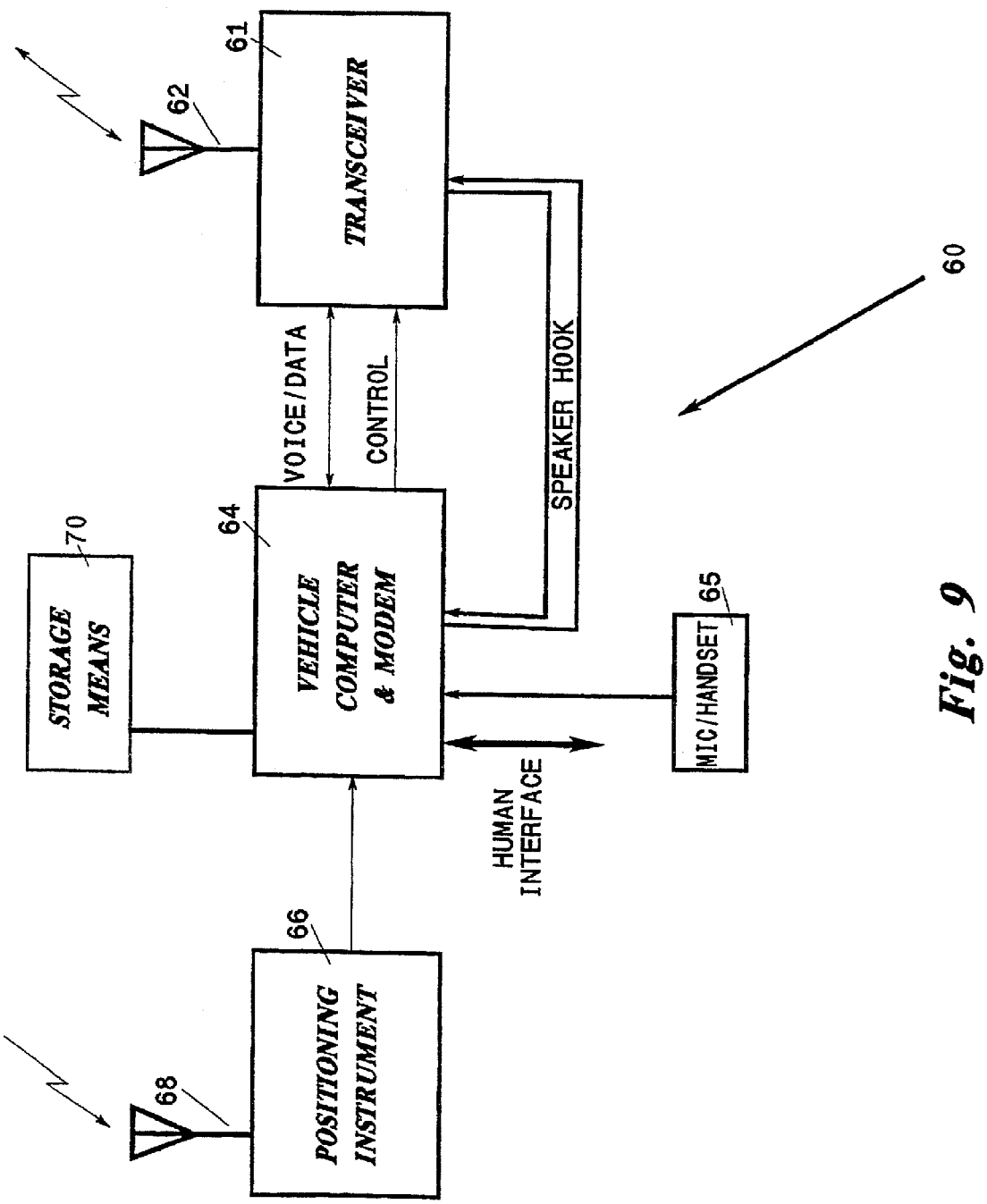
FIG. 9 is a block diagram showing the principal components of a control unit in respect of each of the remote units in accordance with a preferred embodiment of the invention for carrying out a dispatching function.

FIG. 9 shows the principal components associated with a participant allocation unit 60 located in each of the vehicles. Allocation unit 60 preferably includes a transceiver 61 coupled to an antenna 62 for effecting bidirectional communication with the transceiver 50 in the control center 37. Transceiver 61 is connected to a vehicle computer 64 coupled to a microphone/handset 65 providing a human interface between the vehicle computer 64 and the corresponding taxi driver.

A Global Positioning System 66 (GPS) or other position determining system as known in the art receives positioning data via an antenna 68. The Global Positioning System 66 is coupled to the vehicle computer 64 and functions as a positioning means for providing positioning information relative to a predetermined origin in respect of the corresponding participant. Thus, once the location of the customer is provided to the vehicle computer 64, the latter, being coupled to the Global Positioning System 66 is able to determine the relative location of the participant to the customer and thus determine the participant's priority.

Associated with the vehicle computer 64 is a storage means 70 for storing the protocol according to which priorities are assigned. Also stored in the storage means 70 are any singular areas which can affect the actual route e.g. obstructions such as rivers, road blocks and so on which result in the actual route distance being longer than it would otherwise be. As explained above, the handset 65 allows the driver to assign himself a priority outside the range of the priority scale and, by such means, to exclude himself from the process of targeting. It also includes a microphone for establishing voice contact with the control center, as well as paging means for obtaining a text message therefrom.

The system described above may include a full duplex broadcast network such that the control center does not need to await responses from all of the participants before targeting the highest priority participants. Thus, specifically, as soon as a valid response is received by the control center, the participants corresponding to the response can immediately be targeted or identified whilst informing other participants to stop transmitting indication signals or identification messages. This permits the steps of targeting and/or identifying participants to be effected more quickly. However, the invention may also be employed in a simplex (i.e. half-duplex) broadcast network, albeit at the expense of longer targeting and identification times since the control center cannot transmit to the participants until all their responses have first been received and validated.

It will be appreciated that, instead of employing a Global Positioning System, other systems for determining a participant's location can equally well be employed. For example, a route scheduler based on dead reckoning responsive to each participant's location can be used for determining a route having minimum distance. Such a route scheduler might possibly comprise sensors located at intervals along the road for sensing a passing vehicle's presence and for transmitting to the vehicle data representative of its location relative to a specified location for error correction. Typically, such a route scheduler has a memory for storing therein a scaled contour map so that an optimal route can be determined taking into consideration the nature of the terrain. Likewise, prevailing traffic conditions can be fed into the route scheduler at regular intervals of time, so that traffic jams, roadwork and so on can be considered when determining the optimal route.

In the foregoing description it has also been assumed that a single channel broadcast network is employed. However, this is by no means essential and a centralized controlled trunking system having at least two channels may equally well be employed. This permits more than one task to be handled simultaneously each on a different broadcast channel. Thus, in the case of a two channel broadcast network, for example, having first and second channels, each call message is transmitted via a broadcast control channel so as to be received by all the participants associated with the first channel. Upon determining that he has not been targeted by the control center, a participant starts to measure elapsed time and waits a predetermined elapsed time locked on to the first channel and thereafter returns to the broadcast control channel for receiving further call messages.

The period of time during which a non-targeted participant remains locked on to the first channel is of sufficient duration to allow an updated priority to be assigned to the participant. Owing to the dynamic variation in a participant's status, it may occur that, with an updated priority, a previously non-targeted participant becomes targeted in the next iteration. Thus, the period of time during which a non-targeted participant remains locked on to the first channel must further be of sufficient duration to allow a corresponding indication signal and/or identification message to be transmitted by the participant to the control center, whereby the control center may target and/or identify the participant.

Alternatively, the call message may be transmitted via a broadcast control channel so as to be received by all the participants associated with the first channel and, upon determining that he has not been targeted by the control center, a participant receives from the control center an instruction to return immediately to the broadcast control channel. This immediately frees a non-targeted participant to participate in a subsequent search strategy on the second channel relating to a different task.

According to yet another variation, an initial call message is transmitted together with the selection criteria via a broadcast control channel so as to be received by all the participants associated with the first channel. Each of the participants receiving the call message assigns to himself from the priority scale a respective priority representative of his relative suitability in accordance with the selection criteria and transmits an indication signal during a respective indication slot. Only the targeted participants remain switched to the first channel and subsequent call messages are transmitted only to those participants who have been previously targeted by the control center. This again frees a non-targeted participant to participate in a subsequent search strategy on the second channel relating to a different task.

It will be appreciated that whilst the invention has been described with particular application to a taxi dispatching service, the invention has more general application wherever one or a group amongst a plurality of participants is to be targeted in accordance with their respective suitabilities based on at least one selection criterion. It will further be understood that, whilst the preferred embodiment has been described for the sake of simplicity with regard to only two selection criterion (i.e. distance and waiting time), in practice a large number of selection criteria may be employed, all having different relative weights, whereby an integrated search strategy may be implemented.

It will also be understood that whilst the invention has been described with particular reference to 2 dimensional terrain, it can equally well be applied in 3 dimensional space and is thus suitable for air or space travel, as well as land and sea.

Mention should also be made of the variable parameters in association with which the protocol functions. These are generally application dependent and typically are provided with default values built into the protocol. Thus, if distance is one of the selection criteria, this fact may be represented by a default value of an associated parameter. Likewise, the lower and upper bounds of the priority scale and the priority resolution associated with each iteration in phase one can been assigned to respective parameters each having corresponding default values.

Any unassigned parameters must, of course, have values assigned thereto prior to initiation of phase one. This can be done during the initiation of the process prior to transmitting the first call message to the participants. However, in certain applications, all the parameters may have pre-assigned default values which are acceptable for the application. In this case, the call message merely starts the process enabling the participants to determine the appropriate priority scale and assign themselves respective priorities at the appropriate priority resolution; there being no need to inform any of the participants of the boundary values of the priority scale or of the priority resolution or indeed of the selection criteria.

While the invention has been described with particular reference to a wireless broadcast network, it will be appreciated that the invention is capable of much more general application. For example, hard-wired communication systems may also employ the principles of the invention in which case the indication signals need no longer be CW. In such cases the dynamic variables would generally not be position; however the system is generally applicable to systems with any set of dynamic variables.

The principles of the invention may also be used in a routing system, for example to a system which identifies buses or other vehicles which are delayed and adjusts the speed and/or location of other buses to compensate therefor. In the first (targeting) stage of this utilization of the invention, the priority would for example be based on the amount of time that a vehicle is behind schedule. Vehicles which are behind schedule more than a predetermined amount would then be targeted and identified in a second (identification) stage. Preferably, the identified bus would then be asked for its exact position. Due to the fixed lineal nature of bus routes, the position of the bus on the route is a one dimensional function, i.e., the distance along the path.

A query would then be sent to other busses on the same bus line asking them for their positions and, optionally, where they stand in relation to their schedule. Based on this information, a control center would determine corrective action to provide improved service, which may include steps such as speeding up some buses, as for example by operating them in a skip-stop fashion, slowing some buses down, keeping some buses from leaving the terminal or adding new buses to the route, perhaps at some intermediate point on the route. Some indication of occupancy of the buses would help to avoid sending full or almost full busses to load additional passengers when less full buses are available. Such indication, which could, for example, be keyed in by the bus driver, would help in optimizing routing decisions. Suitable instructions would, of course, be transmitted to these busses after a corrective action plan is formulated.

Alternatively, information on deviations from schedule are ignored, and a revised schedule is based only on the position of the buses and optionally on their occupancy.

The principles of the invention are also applicable to a routing system for determining slow areas of traffic and rerouting traffic around such areas. In such a system a large number of participating vehicles are queried as to the delays they are experiencing, and the delay time is one example of a "characteristic value" for the first phase of this embodiment. When a vehicle experiences a delay above a threshold, the position of the vehicle is determined in the second phase. It should be noted that no identification signal per se is transmitted in the second phase, instead a position signal is broadcast. Preferably, the delay is also verified by the driver of the vehicle to avoid false alarms.

Once the position of the targeted delayed vehicle is determined, a new first (targeting) stage determines those vehicles that are close to the specific delayed vehicle, and determines, by successive second stages, the extent of the delay as a function of the time of the delay. Furthermore, by making multiple queries, the traffic conditions can be estimated. Based on this information, the seriousness of the delay may be determined and corrective action, such as re-routing of other vehicles, may be started. In particular, information on the traffic conditions and the geographical extent of the delay may be transmitted to vehicles which have routing apparatus of types which are known in the art, to be used by these apparatus for determining the optimum route for the receiving vehicle.

In an alternative preferred embodiment of the invention, the first query requests responses only from vehicles which are experiencing delays greater than a given time (or which are moving at an average velocity of less than a given velocity). Those vehicles which meet the criteria then broadcast a signal in a time or time/frequency or frequency slot which is indicative of the absolute position of the vehicle. As in some of the previous embodiments of the invention, it is expected that more than one vehicle will broadcast in a particular slot and the system is interested, at least at this stage, only in determining if there are vehicles which are experiencing delays of a given magnitude.

Figure 10:
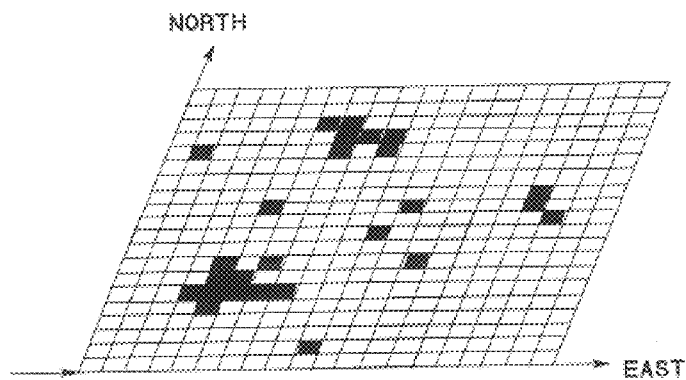
FIG. 10 shows an initial map generated in an IVHS system in accordance with a preferred embodiment of the invention.

FIG. 10 shows an initial map generated by such a method, wherein the area represented by a pixel (slot) may, for example, be of the order of 250 to 1000 meters square.

Figure 11:
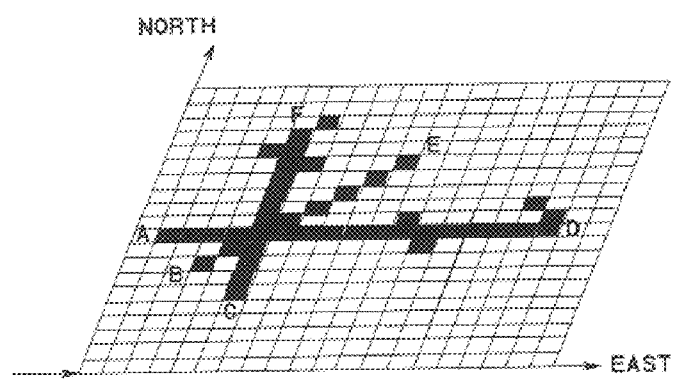
FIG. 11 shows a second, more detailed map, generated during a second iteration in an IVHS application in accordance with a preferred embodiment of the invention.

In a preferred embodiment of the invention, the system then determines, based, inter alia, on the extent of the various contiguous areas which shows positive responses, a smaller area or areas for further study. Preferably, the system then broadcasts a further query requesting those vehicles within the more restricted area which have at least a given delay (which may be the same as or different from that used in the first query) to broadcast in a position slot using a finer resolution, for example, 100 to 250 meters. Based on the responses to this query a second map such as that shown in FIG. 11 is generated. As can be seen from FIG. 11, various branches of a road network radiating from an intersection, designated as A–F in FIG. 11, can be identified. To improve the usefulness of the display, a background map, such as a road map may be displayed underlying the displays of any of FIGS. 10, 11 or 13.

Figure 12:
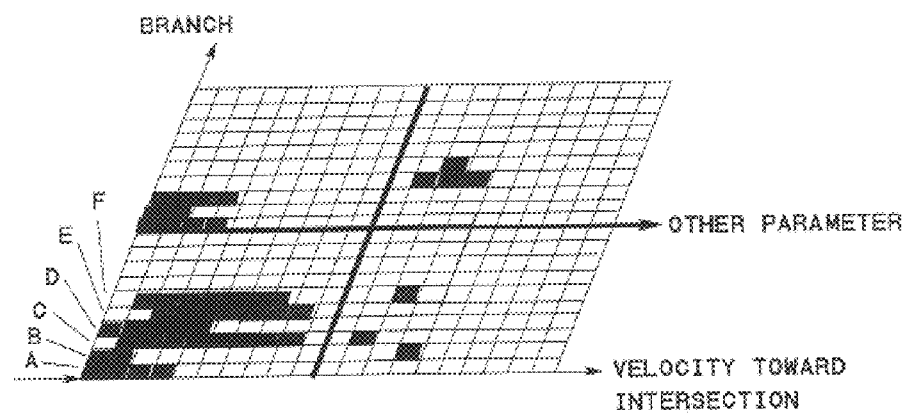
FIG. 12 shows a graph of additional information which is generated in an IVHS application in accordance with a preferred embodiment of the invention.

In the event that additional information relating to the delay is desired, further queries can be made. For example, vehicles which are traveling toward the intersection can be requested to broadcast in a slot which corresponds to the slot they are in and to their velocity toward the intersection. This allows for generation of the graph shown in the lower portion of FIG. 12. Additional slots may be used for the generation of other information regarding the responding stations. Such information may also be graphed as shown in the upper portion of FIG. 12.

Figure 13:
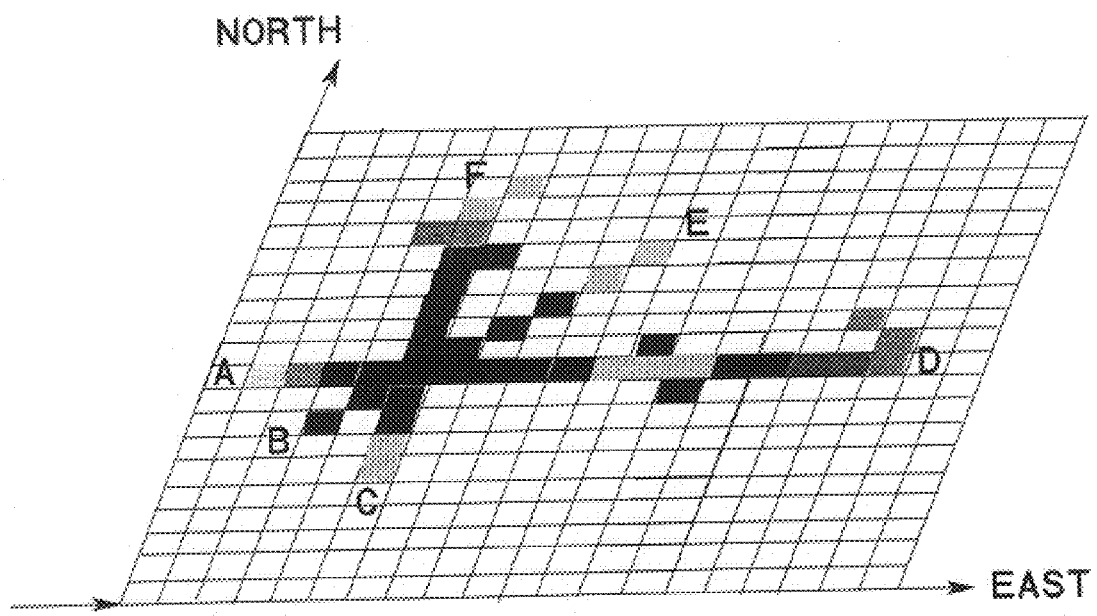
FIG. 13 shows a graph of further additional information which is generated in an IVHS application in accordance with a preferred embodiment of the invention.

Alternatively or additionally, a map which shows the average velocity of the vehicles toward the intersection as a function of the position can be generated. Such a map is shown in FIG. 13. To acquire the information needed for generating such a map, a number of queries may be made, each requesting an indication from all vehicles within the area of interest having a given average velocity toward the intersection. The responding vehicles would broadcast their indication signals in slots corresponding to their position. In the map of FIG. 13 the velocity for a given pixel is determined, for example, as the average velocity of the reporting slots for that position. In a display of the map of FIG. 13, the velocity toward the intersection can, for example, be displayed as a gray scale value or as a color, with for example red being the highest delay and blue being a minimum displayed delay.

Figure 14:
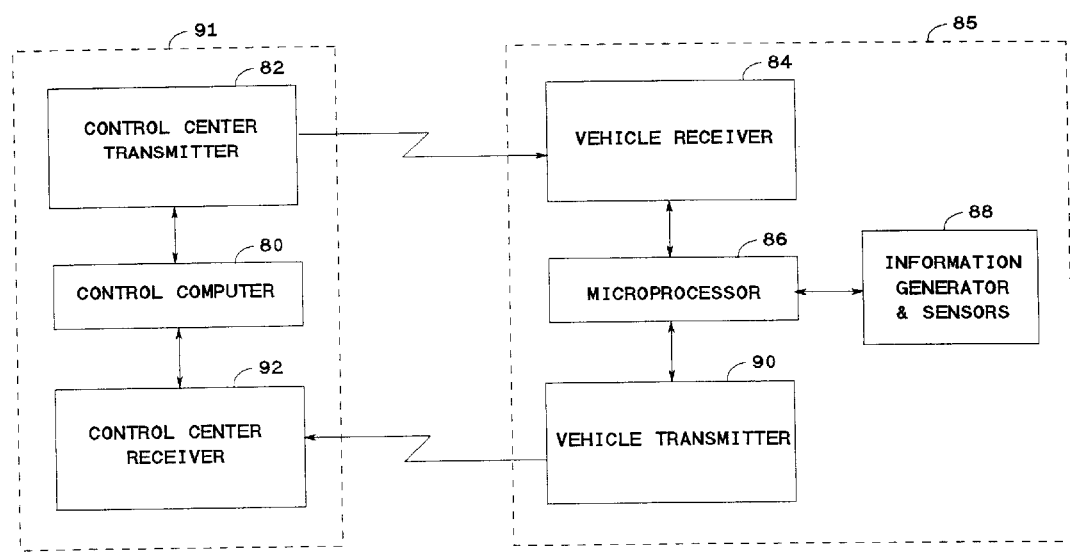
FIG. 14 is a general block diagram of a transmitter for an IVHS system in accordance with a preferred embodiment of the invention.

FIG. 14, which is a generalized block diagram for a system useful for performing the IVHS function described above, shows a base station or control center 91 having a control center transmitter 79 which broadcasts queries and optionally other signals to vehicles on command from a control computer 80. A remote vehicle 85 (only one vehicle is shown for simplicity) receives the query at a vehicle receiver 84 and transmits commands to a microprocessor 86, based on the queries it receives from the control center.

Microprocessor 86 also receives information regarding the status of the vehicle from one or more information generators and sensors indicated by reference numeral 88. This information may be sent by the sensors on a regular basis or may be sent on command from the microprocessor.

Microprocessor 86 is then operative to command vehicle transmitter 90 to transmit indication signals (or if required information bearing signals) in a suitable slot in accordance with the information received by microprocessor 86.

The indication (or other) signals are received by a control center receiver 92 and processed by receiver 92 and computer 80. While the operation and construction of the apparatus designated by reference numerals 82, 84, 86 and 90 is straightforward and needs no further explanation, the operation of receiver 92 is usefully expanded upon with reference to FIG. 15.

The system described above is based on a central decision maker which receives information from vehicles, plans the routing for each vehicle and then broadcasts a route or route changes to the individual vehicles. This type of system has the advantage that the routing for each vehicle takes account of the routing for the other vehicles and the control center in computing the routings can balance the routings to cause minimum delays. The disadvantage of such a system is the large bandwidth required to notify the individual vehicles of their individual corrected routes.

A second approach for routing systems which has been suggested is to have each of the vehicles compute its own route, based on some information about the present status of traffic which it receives from a central transmitter. While such systems require only a limited bandwidth, the routes computed by the individual stations cannot take into account the future effects of the routes of other vehicles.

In a preferred embodiment of the invention, vehicles compute their own routing and then report, in response to a query, their expected time of arrival at locations that are known to have a high incidence of traffic jams and slowdowns (and preferably also additional locations which do in fact have such slowdowns). Preferably, such reporting is performed using the slot method of transmission which does not identify the individual vehicles. Since a large number of vehicles is involved, down-sampling as described below may be effectively used to estimate the numbers of vehicles which pass the locations.

Additionally or alternatively, the future development of existing slowdowns can be estimated from the prior development of the slowdowns, the rate of change of the length of the slowdown and the average speed of the vehicles which are within the slowdown. Such information can be made available to the vehicles based on comparison of the development of slowdowns which are detected by the methods which have been previously described above.

Based on the estimates of the numbers of and times of arrival of the vehicles at the trouble spots, information on future expected traffic jams is generated by the central station and broadcast to the vehicles which update and recalculate their individual routings. This recalculation of routs, broadcast of times of arrival at trouble spots and estimations of future traffic jams and slowdowns gives each vehicle the information required to make a distributed system effective in avoiding future problems, without the huge bandwidth requirements of central calculation of the routes for the vehicles.

Such a distributed method may be applied to fleet management and other systems.

For example, in a preferred embodiment of the invention, the redistribution of a a fleet of taxicabs from a, present, actual distribution to a desired redistribution is accomplished by having the taxicabs choose, based on a predetermined algorithm and information transmitted to them by a central station, which taxicabs will move to a new location. In this redistribution procedure, a present distribution (containing numbers of taxicabs in a region, without necessarily any indication of the position of individual identifiable taxicabs) and a new desired distribution is transmitted to all of the taxicabs. Based on a predetermined protocol, each of the taxis will decide locally if they are to move to a new location. Preferably, a decision by each taxi is based on a statistical model whereby generally approximately the correct number of taxis decide, on their own, to move to new sites. This protocol may consider parameters such as the location, idle time and distance of individual taxi from the area which need additional taxis, as well as the present distribution of taxis and what, statistically, they will choose to do, based on the protocol.

Another similar application of the invention is bus fleet management, where bus distribution information, occupancy information, connection times, location distributions, etc., is broadcast to the bus fleet to enable the buses to make distributed decisions. In particular, based on the information received, a bus may, in effect, instruct itself to skip a bus stop, wait (or not wait) for a connection with another bus, to leave a starting point early (or late), etc.

Generally speaking, the RF signals transmitted by the vehicle may be at any frequency slot. It is to be expected (both for the IVHS application and for the dispatching application described above) that there will a certain amount of frequency diversity caused by the imperfect accuracy and stability of the vehicle transmitters 90. The slots are wide enough to accommodate this diversity.

Furthermore, often the system utilizes very large numbers of vehicles. If too many of these vehicles (in some particular situation) transmit in the same slot, then the total power transmitted may exceed authorized ERP or dynamic range restrictions. To overcome this problem longer, lower power, pulses may be used for indication signals. Furthermore, if a single receiver is used for receiving signals for all of the slots, intermodulation effects may cause spurious signals to appear in slots for which no actual signals have been received.

These problems as well as near-end to far-end transmission problems are substantially solved by the system shown in FIG. 15 and by certain constraints placed on the system which are not shown in FIG. 15.

With respect to excess power problems, if it is expected that many vehicles may transmit in a particular slot, the queries can be designed so that fewer than the total number of vehicles will respond, whenever this is possible. This can be accomplished, for example by having the vehicles choose, statistically, which vehicles will respond within a given percentage of the total number of vehicles. The power transmitted by the vehicles can be adjusted to a minimum based on either the known distance between the vehicle and the control receiver, with each vehicle transmitting just enough power so that detection of the signal by the control station is assured. A further or alternative power adjustment may be made by the vehicle transmitter based on the power received from the control station, for example, during the query. Finally, a closed loop system in which the query includes instructions as to the power levels to be used may be used. It is not desired that such closed loop system result in exactly the same power level being received from each remote station be perfect since this would increase the probability of amplitude correlation between the signals and resultant destructive interference, usually in a situation where a strong line of sight transmission exists between a few vehicles and the base station. A balance should be struck between a reduced variation in the power level received by the control center from the various remote vehicles and keeping the chances of destructive interference low.

Increased pulse duration can also reduce the transmitted power for a given ratio of detection probability to false alarm probability especially in the receiver shown in FIG. 15 and described below.

Preferably, the amplitude of the signals broadcast during the time slot is shaped over the broadcast period to reduce the side-lobes of the signals and avoid false signals in adjacent frequency slots, which may be a problem when large numbers of vehicles broadcast at the same time. Alternatively or additionally, frequency windowing at the receiver may be used to reduce cross-talk between channels.

Dynamic range limitations can be reduced by providing multiple receivers, each covering only a portion of the frequency band. Finally the novel receiver of FIG. 15 may be used to determine the presence or absence of signals in particular slots.

FIG. 15 shows a receiver system corresponding generally to reference number 92 and to a portion of computer 80 of FIG. 14. In general such a receiver is also useful for the first phase of the dispatching system described above as well as for the IVHS system.

An antenna 94 (or an array of antennas) receives signals from a plurality of vehicles simultaneously and passes them to receiver and (optionally) AGC 96. Receiver and AGC 96, which may be of conventional design, downconverts the received signals from RF to IF frequencies. The threshold levels of the detection process may be dependent on the AGC process. The IF signal is digitized by an A/D system 98 and further down converted by a downconverter 100 to base band. It should be understood that this receiver/downconverter system does not demodulate the incoming signals, but only downconverts the RF so that the same relative frequency differences of the signals is present at the output of convertor 100 as in the incoming signals, except that the absolute frequency has been reduced to a low frequency from the RF frequency of the transmitted signal. At these lower frequencies digital systems can be used to analyze and detect the signals.

The low frequency band signals are fed to a series of correlation filters 102 (correlation-type receiver), each of which has a very narrow bandwidth which is related to the correlation time of the correlation filter. Preferably, the frequency bandwidths of adjacent receivers 102 overlap so that the entire bandwidth of each of the slots is covered by one set of receivers 102. The output of each of the receivers is compared to a threshold 104 to determine if a signal is present at the frequency of the respective receiver 102 and the outputs of all of threshold detectors for a given slot are OR gated to determine if any signal is present in the slot. Alternatively, the outputs of the correlation receivers can be summed and this sum signal used to determine if any signal is present in the slot. However, this will generally result in increased noise.

In an alternative preferred embodiment of the invention, the strongest output of the set of correlation receivers is chosen for comparison with a threshold, with or without post-detection integration.

Use of a plurality of overlapping narrow band receivers in this manner also reduces the extent of side lobes of the detection process outside the band of the slot. This allows for closer frequency spacing of the slots since interference between slots having adjacent frequencies is reduced.

One set of receivers 102, threshold detectors 104 and an OR gate is provided for each slot and is referred to herein as a slot detector unit. Slot detector units for all of the slots feed a data processor 108 which, together with computer 80 processes the data as described above. When large numbers of vehicles are used in the system and intermodulation becomes a problem (or if AGC is used, and low level signals are lost), it may be necessary to provide a plurality of front end portions of receiver 92 (the front end being defined as receiver 96, convertor 98 and converter 100), where each front end receives signals from only a portion of the entire frequency band including one or many of the slots. The function of correlation receivers 102 may also be implemented, for example, using set of DFTs or an FFT (for CW signals), matched filters or other correlation receiver methods or other optimum receiver methods, depending on the transmitted signals. Other methods such as energy detectors (e.g., radiometers) with or without tracking may also be used, however, they will give less optimal results, because of practical limitations on input band-pass filter designs.

It should be understood that using a plurality of correlation receivers for the same slot may increase the false alarm probability and hence the threshold for positive detection may be adjusted to provide a desired low false alarm probability.

For all the above applications of the invention, destructive signal interference between units which broadcast in the same slot can be further reduced by performing transmission diversity operations such as random phase (for example, 180° and 0°) and/or amplitude changes, at the transmitters of the remote stations.

Additionally or alternatively, the effect of interference from large signals on small nearby signals can be reduced by performing detection in a two step process. In the first step, only slots having signals having a value above a given level are validated. This level can be fixed in advance or can be adaptive, depending on the signal levels actually detected. If none of the signals are high enough to cause concern that they have caused signals to occur in other slots then, preferably, there is no need for the second step and all signals above a baseline level are validated.

If the two step detection process is chosen, then all stations, except those broadcasting at the validated slots are asked to broadcast again. This will avoid spillover into other slots and the smaller signals can then be properly received without interference. It may be necessary in some cases to repeat this process additional times if very large signal variations are expected.

In a preferred embodiment of the invention, an improved probability of detection may be desired for some of the slots, such as, for example, the control slots. For these slots repeated transmission of signals using transmission diversity may be performed and detection enhancement methods such as post detection integration may be used to improve the detection probability.

The system may also be provided with a display 110 for displaying the data, such as the maps and graphs of FIGS. 10–13 and with a user interface 112 which is used by an operator to control both the operation of the system. The user interface also preferably controls the display and the memory to allow for the operator to review the maps previously generated or to generated new displays based on information previously received.

Information may be sent by the control center to the vehicles to enable them to minimize average travel delays. This information may consist of the above mentioned maps or of travel delay information at various intersections. The vehicles can then use this information to optimize their route. Alternatively, the control center may send routing information to some of the vehicles in order to equalize traffic delays. In either event, the fast response of the system in a matter of seconds allows for real time supervision, adjustment and continuous stabilization of traffic patterns with additional iterations. As described above, in a distributed system only prospective traffic patterns is broadcast by the control center and each vehicle calculates its own route.

The IVHS system described above is also useful in tracking situations such as for fleet management.

In a further preferred embodiment of the invention the position and other characteristics of a large number of vehicles can be mapped and tracked in near real time using a relatively narrow bandwidth. In this embodiment each vehicle is assigned a number of slots, which are used only by that vehicle, according to a predetermined protocol.

The vehicles are preferably first mapped with a preferred mapping phase of a mapping and tracking procedure. A way to perform this phase is to devote a small matrix to each vehicle to be tracked. This smaller matrix is part of the entire matrix of slots assigned by the control center. The smaller matrix represents, for example, (in mapping of spatial coordinates) a square area which is divided into nine sub-areas, each of the subareas represented by one of nine slots assigned to a particular vehicle. In a first iteration a large area is divided into nine sub-areas and a vehicle broadcasts a signal in the slot which corresponds to its present position. In a second step of the mapping phase, the area in which the vehicle previously broadcast is expanded to fill the nine slots, with a finer resolution. Alternatively, the area which is zoomed into the nine slots is slightly larger than the area of the previous broadcast to avoid a situation in which the vehicle was at the border of the area and left the area between steps.

This identification of one sub-area and consequent convergence to a higher resolution is repeated several times until the required resolution is achieved. The highest practical resolution, as will become clear below, is the distance that a vehicle could travel in the time it takes to perform a tracking cycle as described below. Within five iterations the individual resolution can be improved from a 10 km square (divided into nine 3.3 km squares) to resolution of about a 40 meter square area.

It should be understood that while this aspect of the invention is generally described with respect to a two dimensional spatial matrix (north-south and east-west for example) the invention is especially useful and efficient for tracking buses, trains or other such moving remote stations which move along a line (their route). In this very common situation, only one dimensional positional information is required, the dimension being the distance along the route.

In a second, tracking, phase of the mapping and tracking procedure, performed periodically after the required resolution is reached, nine slots, for example, representing a 3×3 area of minimum resolution areas, are used to track additional movements of the vehicle. In one embodiment of the invention the central one of the nine areas corresponds to the area occupied by the vehicle at the end of the mapping phase (or during a previous periodic updating iteration of the tracking phase). During each periodic update, each vehicle broadcasts in a slot which corresponds to either its previous position (the slot corresponding to the center area of the 3×3 group of areas) or one of the adjoining areas. In the next iteration, the newly chosen area is the center of the 3×3 matrix, according to a predetermined protocol.

For a one-dimensional tracking system, only three slots are required, where one slot (conceptually the center slot) represents the last previous position along the route and the other two slots represent positions in the two directions along the route.

In a further preferred variation of this embodiment of the invention, only 5 slots are utilized to map into the 3×3 area. One of these slots represents, as a reference, one of the corner (or the center) areas of the 3×3 area and the other slots represent north-south or east-west variations. In this the vehicle may broadcast during one or two of the five slots, depending on the deviation, if any, from the corner (or center) area chosen as reference. If the vehicle is in the reference area, broadcasting takes place only in the slot which represents the reference area. If the vehicle is in the areas north-south-east or west of the reference, then the vehicle broadcasts in only one slot representing such deviation from the reference. If the vehicle moves into an area diagonally shifted from the reference, the vehicle will broadcast during two slots representing, for example, the east-west and north-south deviations of the area in which the vehicle is situated.

Similarly, only two slots would be needed for one-dimensional mapping.

If a vehicle does not respond or its response was not detected during a given iteration (i.e., if the vehicle is lost or an erroneous code is received) a number of remedial steps are possible. The particular vehicle (or some or all the vehicles) may be requested to retransmit the particular iteration, or may be asked to return to perform the previous iteration or a sequence of previous iterations or to operate at a lower mapping resolution. In some situations it may be desirable to start the process over, at the lowest resolution for the particular vehicle or for all of the vehicles, for example to repeat the entire process or some of the steps of the process to increase reliability and to deduce the extent of accumulated errors, even if no errors are detected. The process may be repeated using the previous position information or with present information with a lower resolution especially to find "lost" vehicles.

FIG. 16B shows the slots in which a signal would be broadcast in the tracking phase (or possibly in the mapping phase) to indicate each of three positions of the vehicle shown in FIG. 16A, while FIG. 16C shows the slots which would be used if a corner area were used as the reference. It should be noted that for either case the vehicle was in the center area during the previous tracking iteration.

While it appears from FIGS. 16A–16C that it is desirable to have north south deviations represented by a change in slot frequency and east west variations represented by a change in slot time, it is actually more practical to use the same frequency for all small matrix slots used by a particular vehicle, since this requires only one transmitter per vehicle.

While it is desirable to dedicate particular transmission slots for each vehicle, it is possible to have overlapping assigned transmission slots. For example, if one slot for one vehicle is the same as a slot for another vehicle, then if a signal is received in the shared slot, the systems checks if a signal was received in one of the unshared slots for one of the vehicles. If it was, then the signal in the shared slot is considered as coming from the other vehicle. If no signal is received in unshared slots for either vehicle, then the signal is considered as coming from both vehicles.

In a preferred embodiment of the invention, nine areas are represented by a four bit word which is more than sufficient to define the 3×3 matrix of elements. In this or similar cases the "physical slots" described above may be represented by any convenient code.

Furthermore, the logical slots may have different meanings or resolutions in the same logical matrices. For example, the position resolution of the logical elements may depend on the maximum expected velocity of the vehicle and the resolution in the two mapped directions need not be the same. Additionally, for mapping and tracking along a road, one dimension may be the (one dimensional) position along the length of the road and other logical slots, if any, may, for example, represent the lane in which the vehicle is traveling. Alternatively, as described above, only one-dimensional tracking may be performed.

While according to one preferred embodiment of the invention, as described in the previous paragraph, the spatial resolution of the system is fixed and depend on the maximum expected velocity of the system, this embodiment limits the number of vehicles which can be tracked and/or the spatial resolution with which they are tracked. For example, if the time between queries is three seconds, the space resolution cannot be any finer than the distance the vehicle would travel at maximum speed. If a particular resolution is required for slow moving vehicles, then the number of vehicles must be limited so that no vehicle, moving at its top speed, would be outside the range of the 3×3 or 3×1 position matrix at this resolution when the next position query is responded to.

In order to improve the trade-off between spatial resolution and number of vehicles, the resolution of the system is adapted to the current speed of the vehicle, in accordance with a preferred embodiment of the invention.

In accordance with one particular embodiment, an additional slot is associated with each vehicle. The vehicle transmits a signal in this slot in accordance with its present velocity (or distance traveled since the previous query) and an associated resolution of the slot. Thus if the vehicle velocity (or distance traveled) is greater than a given velocity (or distance), a signal is broadcast in the additional slot. When such a signal is broadcast, the resolution of the slots is decreased to accommodate the higher velocity (or distance). When no such signal is broadcast, the resolution is at the higher level.

In accordance with a second particular embodiment, no additional slot is required for adaptive resolution. In addition, the resolution may be varied in small discreet steps rather than there being only two steps. In accordance with this embodiment, the resolution represented by the slots depends on the prior history of the vehicle. If, for example, if a vehicle broadcasts that it is moving in a particular direction for more than a given number of iterative queries of position, the supposition is that its speed is increasing. For this situation the resolution of the system, for that vehicle, is reduced, automatically, by increasing the distance represented by each resolution element. For example, if a bus or other unit broadcasts twice (or alternatively three times) in a row in the slot representing movement out of the central slot in a given direction, the resolution is decreased by a given percentage, for example 10%–50%. If the situation continues, then the resolution is decreased further, until the unit broadcasts, at least some of the time, in the slot which represents the "central" position. On the other hand, if the unit responds in the central position more than a given number of times, then supposition is that the speed is decreasing or that the unit is stopped. In this situation the resolution is increased, in stages, until either the unit broadcasts occasionally in the left of right positions or until it reaches a maximum resolution.

It should be understood that since the unit does not generally accelerate to high speed in a very short time, especially from a stop, there is little or no chance that synchronization will be lost, even if a very high resolution is used when the vehicle is stopped or moving very slowly. The highest resolution may, in this embodiment, be limited only by how far the vehicle can move from a stopped condition, during the system cycle time. This is a much higher resolution than the distance it can move at top speed which is the highest resolution for the non-adaptive system.

In accordance with a third particular embodiment, a 4×4 or 4×1 matrix of positions is allocated, depending on whether two or three dimensional mapping is required. In this embodiment, the center of the position element which was previously reported as containing the unit is translated, for the next iteration, to reside at the center of the matrix, i.e., between resolution elements. The distances represented by the slots is then adjusted based on the history of position indications received from the unit.

In accordance with a fourth particular embodiment of the invention a 2×2 or 2×2 matrix is assigned for each vehicle during the tracking stage. The central position represents the center of the last previous reported position element as in the third particular embodiment. In this system, the unit must report "movement" to the left or right. However, this reporting actually represents whether it is at the left or right of the center of the last previous reporting element and may not represent actual movements to the left or right or any actual movement at all.

If the vehicle reports that it has moved to the left during the query time for two (or three) consecutive queries, then the distance represented by each slot is increased, as described above. When the resolution is consistent with the speed of the unit, the unit will report alternate leftward and rightward "movements." It should be understood that this reporting does not represent actual leftward and rightward movements but rather movements greater than or less than one half-resolution element.

If the resolution has been decreased as a result of movement in one direction and the resolution has been adjusted to suit, partially or fully, continued alternating leftward and rightward reports may represent either continued movement at the same speed or slowing down of the vehicle. Thus, the size of the resolution element is reduced (the resolution is increased) until the alternative direction reporting sequence no longer holds or until a minimum resolution element is achieved. It should be understood, that when the unit is stationary, the alternative reporting situation will always result, so that an increase in resolution (to the maximum available based on the acceleration of the unit) should be attempted whenever the alternative direction reporting sequence is achieved.

In accordance with a fifth particular embodiment, utilizing the same logic as the fourth embodiment, only a single slot need be assigned to each vehicle traveling along a route. In this fifth embodiment the broadcasting of a signal within the slot or silence indicates either the left or right logical slot of the fourth particular embodiment.

Furthermore, if only forward movement is assumed, then at least one less slot is required (except of course for the fifth particular embodiment, since movement need only be reported in one direction for each dimension.

In addition to tracking position, the above described systems can be used to report additional variables. For example, for buses, other slots may be used to provide other information about the bus such as occupancy level. In such a situation after an initialization phase similar to that for position, one slot may represent no substantial change in the occupancy, with two other slots representing an increased occupancy of the bus and another slot representing a decreased occupancy. Such allocation allows for occupancy to be tracked in a simple way, similar to the position tracking described above, simultaneously with the position tracking or at a lower frequency, interleaved with the position tracking responses.

While the preceding mapping and tracking system implies that each vehicle in the system is a priori included in the map, this is not necessarily a requirement of the system. Each of these vehicles would then be assigned slots for use in the mapping and/or tracking phases. The vehicles from whom identification is requested may be chosen in accordance with a criteria of the vehicle determined according to any one of the procedures outlined above in which vehicle having certain characteristics are determined.

In a mapping and/or tracking system according to the present invention only a small number of bits must be transmitted for each iteration. Using such a system can be especially worthwhile if the transmission protocols and equipment are designed according to the criteria described above with regard to the targeting and identification and IVHS systems. In the present system, and for systems having only several bits (such as up to 10 or a few tens of bits) of information, it is useful to use a transmission protocol without interleaving and FEC. Furthermore, protocols which require a preamble including a substantial number of training pulses for locking onto the frequency are also wasteful in view of the small number of transmitted pulses. In a preferred transmission/receiving system, the transmitted pulses are made long enough so that their bandwidth is very narrow and are received by a system which is capable of taking advantage of such a narrow bandwidth system despite the inherent instability of the transmitters. Such a system is described above with respect to FIG. 15.

Furthermore, the transmission power of such systems need not be very high, even for transmission over relatively long distances, because of the very high effective signal to noise ratio of the receivers. Nor does the power have to be very constant over the transmission, since the receiver is sensitive to the total energy in the pulses and is not sensitive to the transient rise of the transmitter. Thus, there is no need in the present system to wait for the power in the transmission to rise to the design value as in conventional systems. This combination of factors allows for transmission to begin almost immediately, without considering the attack, or rise time of the transmitter.

It may also be useful, in a preferred embodiment of the invention, to provide diversity techniques, such as time and/or frequency and/or microscopic space diversity techniques, as are known in the art, to improve system reliability, especially in a mobile communication environment.

Thus, while the pulse widths used in the present system may be several times longer than those used in standard digital transmission systems, the lack of overhead caused by the absence of locking preambles, wait for transmitter power attack time and error correction more than makes up for the longer pulse times, for relatively small numbers of bits per transmission. The exact design of a system depends on many factors such as distance, power available, resolution required, available bandwidth, etc. However, it has been found that, in general, the present invention provides a much higher capability for mapping and tracking than conventional systems.

In general, one or more base stations may be used for broadcasting calls and/or receiving responses from remote stations. If more than one base station is used, each station preferably performs a reduction of the data which it receives by either choosing its best candidate for performing the task or by performing a mapping function of its nearby region or of its associated vehicles. The base stations then preferably send this reduced information to a central base station which makes the final decision, constructs the desired map or performs any other final analysis. Furthermore, the central base station would, in a preferred embodiment of the invention, instruct each of the base stations as to which additional queries they should make. In this situation the subsequent queries need not be the same for all the base stations.

In addition, in a preferred embodiment of the systems of the invention, the base station broadcasts the information which it has received from all the stations. This information is preferably broadcast on a separate conventional data transmission channel. The signal is received by the remote stations and is used for error correction by them and, preferably, to allow for improved stabilization of a traffic situation or improved interaction between the various remote vehicles as described above.

For large areas of coverage, the area may be serviced by a plurality of base stations which are all available to receive signals from all of the remote stations. This redundancy of base station receivers allows for mapping and tracking over a larger area than with a single base station. Furthermore, in a preferred embodiment of the invention, the base stations are the preferential receiver for those remote stations which are closest to it. In this regard, transfer of a remote station from one preferential base station to another is automatic since it can be made based on the previous map of the positions of the remote stations. Such preferential assignment of the remote stations to a base station may be accomplished without any action by the remote station such as a change in slot allocation and the chances of losing synchronization with the remote station, as often occurs with cellular systems, is minimized.

While the preferred base station is the primary receiver of signals from "its" remote stations, signals received from other base stations may also be used. If such signals are used, the weight given to them may depend on the position of the remote station. This may be considered an advanced form of macroscopic diversity.

In a preferred embodiment of the invention, the targeting and preferably the identification protocols described above may be performed in conjunction with the mapping and tracking protocols of the present invention. In this way a subset of remote stations whose movement or other characteristic values are of interest are first targeted, preferably identified and then mapped and tracked in accordance with mapping and targeting protocols. It may be desirable to assign particular slots to the identified units prior to the mapping and tracking sequences.

If the targeting criterion is the same as the criteria to be tracked (for example position), then the mapping stage may begin at the resolution range utilized in the targeting phase, or omitted altogether.

In a further preferred embodiment of the invention, a pager system having an appointment making capability operates on principles similar to those described above. For example, the pager system may broadcast a request to one or more pagers which also incorporate an appointment calendar. The individual pagers broadcast a signal in one or more of a matrix of slots which correspond to busy times. The appointment may then be made for other times. The individuals are then notified, by pager, that an appointment has been made for them.

In many of the above embodiments of the invention, the system is triggered and/or synchronized according to a synch signal broadcast by the control station. Other sources of synchronization, which synchronize both the remote and control station, such as GPS received signals or other timing signals, can be used to trigger and/or synchronize the system.

Reference is made to PCT application PCT/EP95/01330, the disclosure of which is incorporated herein by reference, and especially to an analysis of the communication resources required by some of the embodiments of the above described inventive apparatus and method compared to polling. This analysis may be useful in giving a better understanding of the reasons for the improved performance of the present invention.

The invention has been described herein using examples in which the indication signals are transmitted in time, frequency or time and frequency slots. Other types of transmission slots are also useful in the invention such as frequency hopping and other spread-spectrum transmission slots. The term "transmission slots" or "slots" as used herein includes all these types of slots.

What is claimed is:

1. A method of mapping a plurality of remote stations each having at least one varying attribute, including its position, affecting a characteristic value for the station, which characteristic value is computed according to a predetermined procedure from the at least one varying attribute, including the position, comprising:

(a) assigning at least one transmission slot to each of the remote stations;

(b) determining, by the respective stations, of their characteristic values, said characteristic value being responsive to said determining of position;

(c) initially transmitting, by the respective stations, of a signal responsive to their determined characteristic values in said at least one assigned slot, said transmitted signal being based on said characteristic value, said characteristic value being expressed with a first characteristic value resolution; and (d) subsequently transmitting, by the stations, of a signal related to their respective characteristic value in said at least one assigned transmission slot, said subsequent transmitted signal being based on said characteristic value having a finer characteristic value resolution relative to said first characteristic value resolution.

2. A method according to claim 1 including repeating at least (b) and (c) utilizing a finer resolution of characteristic values than in a preceding iteration of (b).

3. A method according to claim 1 wherein at least one communication slot comprises a plurality of communication slots.

4. A method according to claim 1, wherein the presence or absence of energy in a particular slot defines a single bit of information.

5. A method of tracking variations in a characteristic value of remote stations each having at least one varying attribute affecting a characteristic value for the station, which characteristic value is computed according to a predetermined procedure, comprising:

(a) assigning at least one transmission slot to each of the remote stations;

(b) determining a characteristic value for the stations;

(c) transmitting a signal responsive to said characteristic value in said at least one transmission slot;

(d) determining, by the respective stations, of a differential value, based on their characteristic values relative to a previously determined characteristic value; and (e) transmitting, by the respective stations, of said differential value in said at least one assigned transmission slot, wherein the remote stations are movable stations and wherein the characteristic value includes the position of the remote station.

6. A method according to claim 5, wherein the presence or absence of energy in a particular slot defines a single bit of information.

7. A method for transmitting information from a plurality of remote stations, said information being related to locally varying attributes of the stations, comprising:
   (a) supplying a synchronizing signal at each of the plurality of remote stations;
   (b) determining, at each of the plurality of stations, of a characteristic value that is a function of at least one of the attributes of the respective station, determined according to a given procedure; and
   (c) transmitting by the stations, in response to the synchronizing signal, of a response signal,
   wherein the response signal is transmitted in the at least one distinguishable communication slot, transmission in a particular slot being indicative of the determined characteristic value and wherein said signal does not identify the transmitting station; and
   wherein said at least one locally varying attribute comprises at least one of a distance, time, position, location, time deviation, time delay, time of arrival, occupancy and speed.

8. A method according to claim 7 wherein said signal bears no information other than by its transmission in said at least one slot.

9. A method according to claim 7 and including:
   repeating at least (a) and (b) for those remote stations which previously transmitted a response signal in at least one but not all of the communications slots.

10. A method according to claim 7 wherein said response signals are transmitted, in accordance with a protocol, by more than one station in a given communication slot.

11. A method according claim 7 wherein the at least one communication slot is a single communication slot.

12. A method according to claim 7, wherein all of the responding stations transmit a response signal at substantially the same frequency.

13. A method according to claim 7 wherein the communication slots have different time and frequency characteristics.

14. A method according to claim 7, wherein the stations transmit in a predetermined transmission channel divided into a multiplicity of communication slots, including a plurality of said at least one communication slots and wherein said at least one communication slots represents a range of the characteristic value.

15. A method according to claim 7, wherein the characteristic value is based on a plurality of said attributes.

16. A method according to claim 7 wherein said synchronizing signal is a call signal received by said remote stations.

17. A method according to claim 16 wherein said performance of (b) and (c) is requested by said call signal only from those stations having a characteristic value within a restricted range of values.

18. A method according to claim 17 wherein the stations respond to the call by transmitting a response signal in a communication slot indicative of a more restrictive range of the calculated characteristic value within the restricted range of values.

19. A method according claim 7 and including transmitting a further call requesting at least some of the remote stations to repeat (b) and (c).

20. A method according to claim 7 and including:
   estimating the number of remote stations responding to a synchronizing signal based on the proportion of slots in which a response signal is broadcast.

21. A method according to claim 20 wherein estimating the number of remote stations comprises:
   transmitting a signal, in a random slot chosen from a plurality of slots, by stations having a characteristic value within a given range of characteristic values; and
   estimating the total number of stations that are transmitting based the proportion of the plurality of slots in which the signal is transmitted.

22. A method according to claim 7 and including:
   transmitting a further call requesting those stations having a characteristic value within a narrow range to transmit an information bearing signal.

23. A method according to claim 7 and including transmission of information to at least some remote stations based on the response signals of the remote stations.

24. A method according to claim 7 wherein the given procedure is modified in accordance with a message received by the remote stations.

25. A method according to claim 7 wherein the remote stations are mobile remote stations.

26. A method according to claim 7 wherein the characteristic value does not depend on the identity of the remote station.

27. Methods according to claim 7 including repeating at least (b) and (c) utilizing a more limited range of characteristic values than in a preceding iteration of (b).

28. A method according to claim 7 and including:
   repeating at least steps (b) and (c) utilizing a more limited range of characteristic values than in the preceding step (b).

29. A method according to claim 28 and including;
   repeating at least steps (b) and (c) utilizing a finer resolution of characteristic value than in the preceding step (b).

30. A method according to claim 7 and including;
   repeating at least steps (b) and (c) utilizing a finer resolution of characteristic value than in the preceding step (b).

31. A method according to claim 7 wherein the remote station is a movable station and wherein the varying attribute comprises a position of the station.

32. A method according to claim 7 wherein the remote station is a movable station and wherein the varying attribute comprises a relative position of the station with respect to a location.

33. A method for transmitting information from a plurality of remote stations, said information being related to locally varying attributes of the stations, comprising:
   (a) supplying a synchronizing signal at each of a plurality of remote stations;
   (b) determining, at each of the plurality of stations, of a characteristic value based on at least one of the attributes of the respective stations, according to a given procedure; and
   (c) transmitting, by the stations, in response to the synchronizing signal, of a response signal,
   wherein the response signal is transmitted in at least one communication slot, transmission in a particular slot being indicative of the characteristic value and wherein said response signal bears no information other than by its transmission in said at least one slot; and
   wherein said at least one locally varying attribute comprises at least one of a distance, time, position, location, time deviation, time delay, time of arrival, occupancy and speed.

34. A method for transmitting information from a plurality of remote stations, said information being related to locally varying attributes of the stations, comprising:
- (a) supplying a synchronizing signal at each of a plurality of remote stations;
- (b) determining, at each of the plurality of stations, of a characteristic value based on at least one of the attributes of the respective stations, according to a given procedure; and
- (c) transmitting, by the stations, in response to the synchronizing signal, of a response signal,
- wherein the response signal is transmitted in at least one communication slot, transmission in a particular slot being indicative of the characteristic value; and
- said at least one locally varying attribute comprises at least one of a distance, time, position, location, time deviation, time delay, time of arrival, occupancy and speed, and including
- repeating at least (a) and (b) for those remote stations which previously transmitted a response signal in at least one but not all of the communication slots.

35. A method according to claim 34 wherein (b) and (c) are repeated using a decreasing total range of characteristic values until a predetermined range of characteristic value per communication slot is reached.

36. A method according to claim 34 wherein the remote station is a movable station and wherein the varying attribute comprises a position of the station.

37. A method according to claim 34 wherein the remote station is a movable station and wherein the varying attribute comprises a relative position of the station with respect to a location.

38. Apparatus for transmitting information from a plurality of remote stations, said information being related to locally varying attributes of the stations, comprising:
- (a) a first transmitter which transmits a call to a plurality of said remote stations;
- (b) circuitry at each of the stations, which determines a characteristic of the station based on at least one of the varying attributes of the respective station, in response to the call, according to a given procedure; and
- (c) a plurality of second transmitters each associated with one of the remote stations each of said transmitters being capable of transmitting a signal,
- wherein said transmitters transmit signals in at least one distinguishable communication slot, transmission in said at least one slot being indicative of the determined characteristic; and
- wherein said at least one locally varying attribute comprises at least one of a distance, time, position, location, time deviation, time delay, time of arrival, occupancy and speed.

39. Apparatus according to claim 38 wherein said signals bear no information other than by their transmission in said at least one communication slot.

40. Apparatus according to claim 38 wherein more than one of the plurality of second transmitters intentionally transmits in the same communication slot in accordance with the given procedure.

41. Apparatus according to claim 38 wherein all of the second transmitters transmit at substantially the same frequency.

42. Apparatus according to claim 38 and comprising means for reducing destructive interference between signals which transmit at the same time at the same frequency.

43. Apparatus according to claim 38, wherein the stations respond to the call in a predetermined transmission channel divided into said communication slots and wherein each communication slot represents a range of values of the characteristic value.

44. Apparatus according to claim 38, wherein the characteristic value is based on a plurality of attributes of the station.

45. Apparatus according to claim 38 and including a controller which causes the first transmitter to transmit at least one additional call requesting a response from at least some of the stations.

46. Apparatus according to claim 45 wherein said at least some stations are those stations having a characteristic within a restricted range of values.

47. Apparatus according to claim 45 wherein the stations include a second controller which causes the second transmitters to transmit an additional signal, in response to the additional call, in a communication slot, said communication slot being indicative of the characteristic value within the restricted range of values.

48. Apparatus according to claim 47 wherein said additional signal is a non-information bearing signal.

49. Apparatus according to claim 47 wherein said response signal bears no information regarding the identity of the remote stations.

50. Apparatus according to claim 38 wherein the controller includes:
- circuitry which causes the first transmitter to transmit a further call requesting those stations having a characteristic within a narrow range to transmit an information bearing signal; and
- an actuator associated with each of the stations which causes the second transmitter associated with a station to transmit an identification signal during one of a plurality of communication slots chosen at random by the station; and
- circuitry which chooses one of the stations whose identification signal is received clearly in a communication slot.

51. Apparatus according to claim 38 wherein the at least one slot comprises at least one distinguishable communication slot.

52. Apparatus according to claim 38 wherein the at least one communication slot is a single communication slot.

53. Apparatus according to claim 38 wherein transmitting said signals by the stations is in response to a synchronizing signal at the remote stations.

54. A method according to claim 38 wherein the remote station is a movable station and wherein the varying attribute comprises a position of the station.

55. A method according to claim 38 wherein the remote station is a movable station and wherein the varying attribute comprises a relative position of the station with respect to a location.

56. A method of tracking variations in a characteristic value of remote stations each having at least one varying attribute, which characteristic value is computed according to a predetermined procedure from the at least one varying attribute, comprising
- (a) determining a characteristic value for the stations; and
- (b) transmitting, by the stations, of a signal responsive to said characteristic value in at least one transmission slot, according to a predetermined procedure, the presence or absence of energy in a particular slot defining a range of characteristic values, wherein, according to said procedure, more than one of the stations transmits in the same transmission slot, such that the signals transmitted in a particular slot are not distinguishable from each other; and wherein said at least one locally varying attribute comprises at least one of a distance, time, position, location, time deviation, time delay, time of arrival, occupancy and speed.

57. A method according to claim 56 wherein the presence or absence of energy in a particular slot defines at least a single bit of information.

58. A method according to claim 56 wherein the stations transmits said signals responsive to a synchronizing signal.

59. A method according to claim 56 wherein the remote station is a movable station and wherein the varying attribute comprises a position of the station.

60. A method according to claim 56 wherein the remote station is a movable station and wherein the varying attribute comprises a relative position of the station with respect to a location.

61. A method of transmitting information from a plurality of stations each having a characteristic value, said information being related to at least one locally varying attribute of the station, comprising:

determining a characteristic value based on at least one of the varying attributes of the respective stations at the stations; and transmitting by the stations of a signal in at least one distinguishable transmission slot of a plurality of transmission slots, responsive to the station's determined characteristic value, each of said slots being characteristic of a range of said characteristic values, such that the distribution of slots in which signals are transmitted include information regarding the ranges of characteristic values that are present at the stations, wherein said at least one locally varying attribute comprises at least one of a distance, time, position, location, time deviation, time delay, time of arrival, occupancy and speed.

62. A method according to claim 61 wherein more than one of the stations transmits in the same transmission slot, such that the signals transmitted in a particular slot are not distinguishable from each other.

63. A method according to claim 62 and including:
receiving said signals at a receiver; and
providing a distribution of the ranges of characteristic values that are present in at the stations, based on the received signals.

64. A method according to claim 62 and including:
assigning said slots to individual ones of said stations such that the range of characteristic values at the stations may be determined.

65. A method according to claim 61 wherein the stations transmit said signals responsive to a synchronizing signal.

66. A method according to claim 61 and including:
receiving said signals at a receiver; and
providing a distribution of the ranges of characteristic values that are present in at the stations, based on the received signals.

67. A method according to claim 61 and including:
assigning said slots to individual ones of said stations such that the range of characteristic values at the stations may be determined.

68. A method according to claim 61 wherein the remote station is a movable station and wherein the varying attribute comprises a position of the station.

69. A method according to claim 61 wherein the remote station is a movable station and wherein the varying attribute comprises a relative position of the station with respect to a location.

70. A method of tracking changes in position of a plurality of remote stations, the method comprising:
(a) assigning at least one transmission slot to each of the remote stations;
(b) determining, by the respective stations, of their positions;
(c) initially broadcasting, by the respective stations of their positions;
(d) determining, by the respective stations, of their positions, relative to the previously determined and transmitted positions; and
(e) transmitting, by the respective stations, of the determined relative positions.

71. A method according to claim 70 wherein the method includes:
(f) redetermining, by the respective stations, of their positions, relative to the previously determined and transmitted relative positions; and
(g) subsequently broadcasting, by the respective stations, of the relative positions determined in (f).

72. A method according to claim 71 and including iteratively performing (f) and (g).

73. A method according to claim 72 wherein each of the stations performs (f) and (g) in each iteration.

74. A method according to claim 70 wherein each of the stations performs (b) and (c) before any of the stations perform (e).

75. A method according to claim 70 wherein a region surrounding a previously transmitted position is divided into a plurality of contiguous regions and wherein broadcasting relative positions comprises transmitting a signal in one or more of the transmission slots, which one or more slots indicate which of the regions contains the newly determined relative position.

76. A method according to claim 75 wherein the extent of the regions is established based on an expected maximum rate of change of the position.

77. A method according to claim 75 wherein the plurality of regions comprises 9 regions.

78. A method according to claim 70 wherein 9 slots are utilized for the broadcasting relative position information.

79. A method according to claim 70 wherein 5 slots are utilized for broadcasting relative position information.

80. A method according to claim 70 wherein possible positions of the stations form a line.

81. A method according to claim 80 wherein 3 slots are utilized for broadcasting relative position information.

82. A method according to claim 80 wherein a single slot is utilized for broadcasting relative position information for a particular station.

83. A method according claim 70 wherein the at least one transmission slot has a capacity of 5 bits or less per broadcast.

84. A method according to claim 83 wherein the capacity is no more than three bits per broadcast.

85. A method of mapping the positions of a plurality of remote stations, comprising:
(a) assigning at least one transmission slot to each of the remote stations;
(b) determining by the respective stations, of their positions;
(c) initially broadcasting, by the respective stations, of a signal responsive to their determined positions in said at least one assigned slot, said broadcast position having a first position resolution; and (d) subsequently broadcasting, by the stations, of a signal related to their respective positions in said at least one assigned transmission slot, said subsequent broadcast having a finer position resolution relative to said previously transmitted position.

86. A method according to claim 85 wherein the at least one transmission slot does not have the capability of transmitting a position with a desired resolution in a single broadcast.

87. A method according to claim 85 and comprising repeating (d) with successively finer characteristic value resolutions until the characteristic value is broadcast with a desired characteristic value resolution.

88. A method according to claim 85 wherein the resolution in a particular broadcast is twice as fine as in a previous broadcast.

89. A method according to claim 88 wherein the resolution in a particular broadcast is less than twice as fine as in a previous broadcast.

90. A method according to claim 85 wherein a region is divided into a plurality smaller regions and wherein the initial broadcast indicates which of the smaller regions contains the station.

91. A method according to claim 90 wherein a region, equal to or slightly larger than the initially indicated smaller region is divided into a plurality even smaller regions and wherein the initial broadcast indicates which of the even smaller regions contains the station.

92. A method according to claim 85 wherein mapping as defined by (b) and (c) are performed by:

assigning at least one transmission slot to each of the remote stations;

determining by the respective stations, of their positions;

initially broadcasting, by the respective stations, of a signal responsive to their determined positions in said at least one assigned slot, said broadcast position having a first position resolution; and subsequently broadcasting, by the stations, of a signal related to their respective positions in said at least one assigned transmission slot, said subsequent broadcast having a finer position resolution relative to said previously transmitted position.

93. A method according to claim 92 wherein the number of assigned transmission slots used for mapping and tracking is the same.

94. A method according to claim 92 wherein some of the stations are mapping and some are tracking at the same time.

95. A method according to claim 92 wherein all of the stations complete the step of initially broadcasting before any of the stations complete the step of subsequently broadcasting.

96. A method according to claim 92 wherein the respective stations synchronously carry out the step of initially broadcasting.

97. A method according to claim 92 wherein the respective stations synchronously carry out the step of subsequently broadcasting.

98. A method according to claim 85 wherein all of the stations complete the step of initially broadcasting before any of the stations complete the step of subsequently broadcasting.

99. A method according to claim 85 wherein the respective stations synchronously carry out the step of initially broadcasting.

100. A method according to claim 85 wherein the respective stations synchronously carry out the step of subsequently broadcasting.

101. A method for transmitting information from a plurality of remote stations, the stations having locally varying attributes related to the information, comprising the steps of:

(a) supplying a synchronizing signal at each of a plurality of remote stations;

(b) determining, at each of the plurality of stations, of a characteristic value based on at least one of the attributes of the respective station, according to a given procedure; and (c) transmitting, by the stations, in response to the synchronizing signal of a response signal wherein the response signal is transmitted in at least one distinguishable communication slot which slot is indicative of the determined characteristic value, and said at least one locally varying attribute comprises at least one of a distance, time, position, location, time deviation, time delay, time of arrival, occupancy and speed.

102. A method according to claim 101 wherein said signal bears no information other than by its transmission in said at least one slot.

103. A method according to claim 101 wherein said signal bears no information other than by its transmission in said at least one slot.

104. A method according to claim 101 and including:

repeating at least (a) and (b) for those remote stations which previously transmitted a response signal in at least one but not all of the communication slots.

105. A method according to claim 101 wherein (b) and (c) are repeated using a decreasing total range of characteristic values until a predetermined range of characteristic value per communication slot is reached.

106. A method according to claim 101 wherein said response signals are transmitted, in accordance with a protocol, by more than one station in a given communications slot.

107. A method according to claim 101 wherein the at least one communication slot is a single communication slot.

108. A method according to claim 101 wherein all of the responding stations transmit a response signal at substantially the same frequency.

109. A method according to claim 101 wherein communications slots have different time and frequency characteristics.

110. A method according to claim 101, wherein the stations transmit in a predetermined transmission channel divided into a multiplicity of communication slots, including a plurality of said at least one communication slots and wherein said at least one communication slots represents a range of the characteristic value.

111. A method according to claim 101, wherein the characteristic value is based on a plurality of attributes.

112. A method according to claim 101 wherein said synchronizing signal is a call signal received by said remote stations.

113. A method according to claim 112 wherein said performance of (b) and (c) is requested by said call signal only from those stations having a characteristic value within a restricted range of values.

114. A method according to claim 113 wherein the stations respond to the call by transmitting a response signal in a communication slot indicative of the calculated characteristic value within the restricted range of values.

115. A method according to claim 101 and including transmitting a further call requesting at least some of the remote stations to repeat (a) and (b).

116. A method according to claim 101 and including:
estimating the number of remote stations responding to a synchronizing signal based on the proportion of slots in which a response signal is broadcast.

117. A method according to claim 116 wherein estimating the number of remote stations comprises:
transmitting a signal, in a random slot chosen from a plurality of slots, by stations having a characteristic value within a given range of characteristic values; and
estimating the total number of stations that are transmitting based the proportion of the plurality of slots in which the signal is transmitted.

118. A method according to claim 116 wherein estimating the number of remote stations comprises:
transmitting a signal, in a random slot chosen from a plurality of slots, by stations having a characteristic value within a given range of characteristic values; and
estimating the total number of stations that are transmitting based the proportion of the plurality of slots in which the signal is transmitted.

119. A method according to claim 101 and including:
transmitting a further call requesting those stations having a characteristic value within a narrow range to transmit an information bearing signal.

120. A method according to claim 101 and including transmission of information to at least some remote stations based on the response signals of the remote stations.

121. A method according to claim 101 wherein the given procedure is modified in accordance with a message received by the remote stations.

122. A method according to claim 101 wherein the remote stations are mobile remote stations.

123. A method according to claim 101 wherein the characteristic value does not depend on the identity of the remote station.

124. A method according to claim 101 and including:
repeating at least steps (b) and (c) utilizing a more limited range of characteristic values than in the preceding step (b).

125. A method according to claim 124 and including;
repeating at least steps (b) and (c) utilizing a finer resolution of characteristic value than in the preceding step (b).

126. A method according to claim 101 and including;
repeating at least steps (b) and (c) utilizing a finer resolution of characteristic value than in the preceding step (b).

127. A method according to claim 101 and including;
repeating at least steps (b) and (c) utilizing a finer resolution of characteristic value than in the preceding step (b).

128. A method according to claim 127 and including;
repeating at least steps (b) and (c) utilizing a finer resolution of characteristic value than in the preceding step (b).

129. Apparatus for transmitting information from a plurality of remote stations, the stations having varying attributes related to the information, comprising:

(a) a first transmitter for transmitting a call to a plurality of said remote stations;

(b) determining apparatus at each of the stations, for determining a characteristic of the station based on at least one of the varying attributes of the respective station, in response to the call according to a given procedure; and (c) a plurality of second transmitters each associated with one of the remote stations for transmitting a signal, wherein said transmitters include means for transmitting signals in at least one distinguishable communication slot which at least one slot is indicative of the determined characteristic, and said at least one locally varying attribute comprises at least one of a distance, time, position, location, time deviation, time delay, time of arrival, occupancy and speed.

* * * * *

UNITED STATES PATENT AND TRADEMARK OFFICE
CERTIFICATE OF CORRECTION

PATENT NO.    : 6,437,743 B1
DATED         : August 20, 2002
INVENTOR(S)   : Yosef Mintz It is certified that error appears in the above-identified patent and that said Letters Patent is hereby corrected as shown below:

<u>Title page,</u>
Item [75], Inventors, delete "Paul Fenster, Petach-Tikva (IL)".

Signed and Sealed this

Ninth Day of November, 2004

JON W. DUDAS
*Director of the United States Patent and Trademark Office*